(12) United States Patent
Willigan et al.

(10) Patent No.: US 7,871,957 B2
(45) Date of Patent: Jan. 18, 2011

(54) CATALYST SUPPORT OF MIXED CERIUM ZIRCONIUM TITANIUM OXIDE, INCLUDING USE AND METHOD OF MAKING

(75) Inventors: Rhonda R. Willigan, Manchester, CT (US); Thomas Henry Vanderspurt, Glastonbury, CT (US); Sonia Tulyani, Manchester, CT (US); Rakesh Radhakrishnan, Vernon, CT (US); Susanne Marie Opalka, Glastonbury, CT (US); Sean C. Emerson, Broad Brook, CT (US)

(73) Assignee: UTC Power Corporation, South Windsor, CT (US)

( * ) Notice: Subject to any disclaimer, the term of this patent is extended or adjusted under 35 U.S.C. 154(b) by 871 days.

(21) Appl. No.: 11/803,481

(22) Filed: May 15, 2007

(65) Prior Publication Data

US 2007/0264174 A1    Nov. 15, 2007

Related U.S. Application Data

(60) Continuation-in-part of application No. 11/605,515, filed on Nov. 28, 2006, now Pat. No. 7,612,011, which is a division of application No. 10/402,808, filed on Mar. 28, 2003, now Pat. No. 7,166,263, which is a continuation-in-part of application No. 10/109,161, filed on Mar. 28, 2002, now abandoned, application No. 11/803,481, which is a continuation-in-part of application No. 11/091,241, filed on Mar. 28, 2005, now abandoned.

(51) Int. Cl.
*C01B 3/00*    (2006.01)

(52) U.S. Cl. .................. 502/304; 423/247; 423/437.2; 423/656; 429/412; 429/420; 429/524; 429/525; 429/526; 429/528

(58) Field of Classification Search .......... 502/304; 423/247, 437.2, 656; 429/412, 420, 524–526, 429/528
See application file for complete search history.

(56) References Cited

U.S. PATENT DOCUMENTS

| 6,455,182 | B1 * | 9/2002 | Silver ........................... 429/17 |
| 6,777,117 | B1 * | 8/2004 | Igarashi et al. ................. 429/19 |
| 7,166,263 | B2 * | 1/2007 | Vanderspurt et al. ........ 423/263 |
| 7,612,011 | B2 * | 11/2009 | Vanderspurt et al. ........ 502/302 |
| 2003/0186804 | A1 * | 10/2003 | Wagner et al. ............... 502/300 |
| 2004/0175325 | A1 | 9/2004 | Hagemeyer et al. ......... 136/251 |

OTHER PUBLICATIONS

H. Iida, et al, "Structure Characterization of Pt-Re/TiO2 (rutile) and Pt-Re/ZrO2 Catalysts for Water Gas Shift Reaction at Low Temperature", Applied Catalysis A General 303 (2006) pp. 192-198.
Y. Sato, et al, "Marked Addition Effect of Re Upon the Water Gas Shift Reaction Over TiO2 Supported Pt, Pd and Ir Catalysts", Catalysis Communications 7 (2005/2006) pp. 91-95.
S. Pengpanich, et al, "Catalytic Oxidation of Methane over CeO2-ZrO2 Mixed Oxide Solid Solution Catalysts Prepared Via Urea Hydrolysis", Applied Catalysis A: General 234 (2002) pp. 221-233.
F. Capel, et al, "Structural Characterization and Mixed Conductivity of TiO2-Doped Ceria Stabilized Tetragonal Zirconia", Ceramics International 28 (2002) pp. 627-636.
D. Terribile, et al, "The Preparation of High Surface Area CeO2-ZrO2 Mixed Oxides by a Surfactant-Assisted Approach", Catalysis Today 43 (1998) pp. 79-88.
T. Bunluesin, et al, "Studies of the Water-Gas-Shift Reaction on Ceria-Supported Pt, Pd, and Rh: Implications for Oxygen-Storage Properties", Applied Catalysis B: Environment 15 (1995) pp. 107-114.
G. Vlaic, et al, "Relationship Between the Zirconia-Promoted Reduction in the Rh-Loaded Ce0.5Zr0.5O2 Mixed Oxide and the Zr-O Local Structure", Journal of Catalysis 168 (1997) pp. 386-392.
J-D Lin, et al, "Coprecipitation and Hydrothermal Synthesis of Ultrafine 5.5 mol% CeO2-2 mol% YO1.5-ZrO2 Powders", Journal American Ceramic Society 80 (1997) pp. 92-98.
M. Yashima, et al, "Diffusionless Tetragonal-Cubic Transformation Temperature in Zirconia-Ceria Solid Solutions", Journal of American Ceramics 76 (1993) pp. 2865-2868.
T. Shido, et al, "Reactant-promoted Reaction Mechanism for Water Gas Shift Reaction on Rh-Doped CeO2" Journal of Catalysis 141 (1993) pp. 71-81.
E. Luccini, et al, "Preparation of Zirconia-Ceria Powders by Coprecipitation of a Mixed Zirconium Carbonate in Water with Urea", Int. Journal of Materials and Product Technolog, vol. 4, (1989) pp. 167-175.

\* cited by examiner

*Primary Examiner*—Steven Bos
(74) *Attorney, Agent, or Firm*—Stephen A. Schneeberger

(57) ABSTRACT

A durable catalyst support/catalyst is capable of extended water gas shift operation under conditions of high temperature, pressure, and sulfur levels. The support is a homogeneous, nanocrystalline, mixed metal oxide of at least three metals, the first being cerium, the second being Zr, and/or Hf, and the third importantly being Ti, the three metals comprising at least 80% of the metal constituents of the mixed metal oxide and the Ti being present in a range of 5% to 45% by metals-only atomic percent of the mixed metal oxide. The mixed metal oxide has an average crystallite size less than 6 nm and forms a skeletal structure with pores whose diameters are in the range of 4-9 nm and normally greater than the average crystallite size. The surface area of the skeletal structure per volume of the material of the structure is greater than about 240 $m^2/cm^3$. The method of making and use are also described.

7 Claims, 3 Drawing Sheets

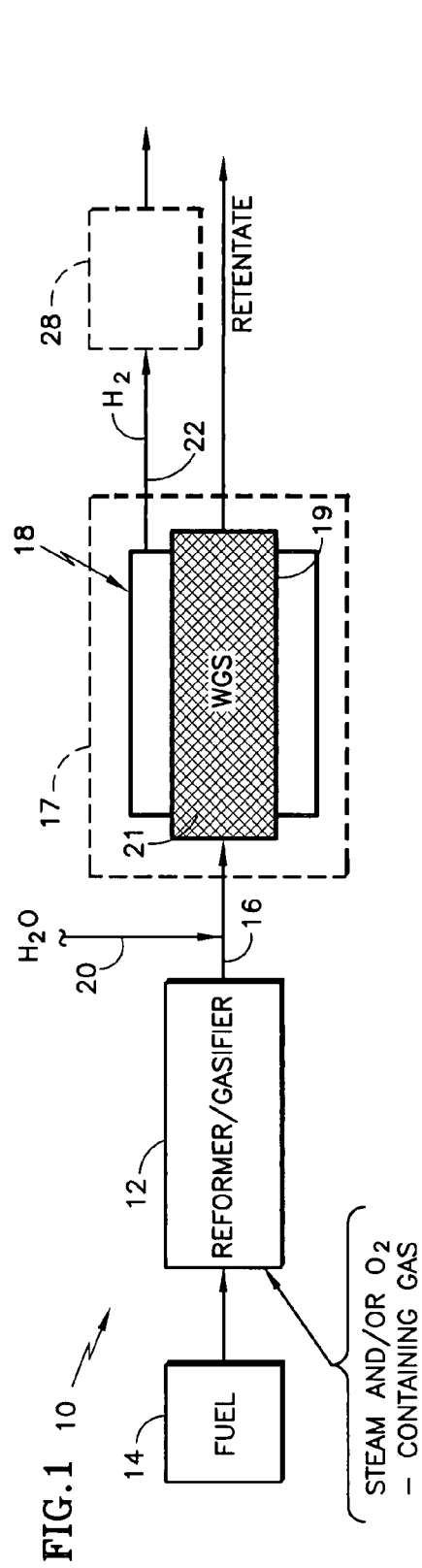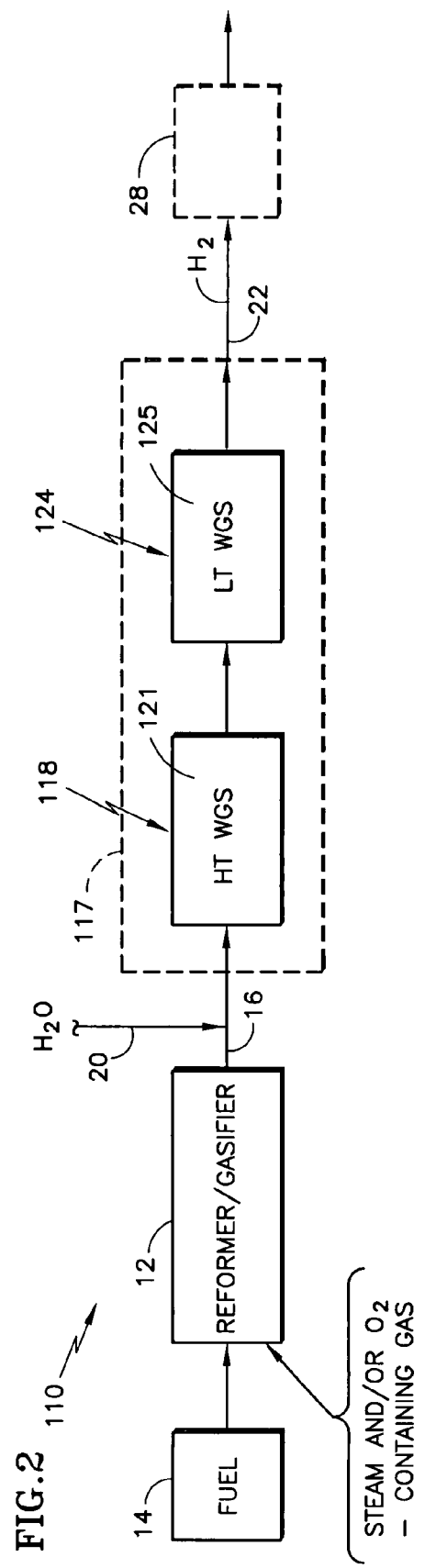

RATE DATA AT 400°C — NORMALIZED TO 2% PT

Legend:
- 80 h
- 100h + SULFUR
- 120 h (POST SHUTDOWN)
- 140–180 h (~5 atm)

|   |   | %PT | %Re |
|---|---|---|---|
| A | Pt/Re-$Ce_{0.36}Zr_{0.33}Ti_{0.31}O_2$ | 3.1 | 1.6 |
| B | Pt/Re-$Ce_{0.52}Zr_{0.39}Ti_{0.09}O_2$ | 3.1 | 1.6 |
| C | Pt/Re-$Ce_{0.36}Zr_{0.22}Ti_{0.42}O_2$ | 3.1 | 1.6 |
| D | Pt/Re-$Ce_{0.69}Hf_{0.25}W_{0.05}O_2$ | 3.1 | 1.6 |
| EA | Pt/Re-$Ti_{0.9}W_{0.1}O_2$ | 3.1 | 1.6 |

US 7,871,957 B2

CATALYST SUPPORT OF MIXED CERIUM ZIRCONIUM TITANIUM OXIDE, INCLUDING USE AND METHOD OF MAKING

CROSS REFERENCE TO RELATED APPLICATIONS

This application is a Continuation-in-Part of U.S. patent application Ser. No. 11/605,515 filed Nov. 28, 2006, now U.S. Pat. No. 7,612,011 by Vanderspurt et al, which is a Divisional of patent application Ser. No. 10/402,808 filed Mar. 28, 2003, now U.S. Pat. No. 7,166,263 by Vanderspurt et al, which in turn is a continuation-in-part of U.S. patent application Ser. No. 10/109,161 filed Mar. 28, 2002, now abandoned. This application is also a Continuation-in-Part of U.S. patent application Ser. No. 11/091,241 filed Mar. 28, 2005, now abandoned.

The U.S. Government has a paid-up license in this invention and the right in limited circumstances to require the patent owner to license others on reasonable terms as provided for by the terms of (contract No. DE-FC26-05NT42453) awarded by the Department of Energy.

TECHNICAL FIELD

This disclosure relates to mixed metal oxides, and more particularly to ceria-based mixed metal oxide structures, for use as catalyst supports and co-catalysts, especially for use in water gas shift reactions and the like. More particularly, the disclosure relates to a durable catalyst support of mixed metal oxide, to a durable water gas shift catalyst supported by such mixed metal oxide, and to the method of making such support and catalyst.

BACKGROUND ART

The importance of hydrogen as a fuel source for fuel cells and the like, serves to emphasize the various processes used to provide hydrogen. Many of those processes rely on the reformation and/or refinement of various hydrocarbon feedstocks, such as petroleum derivatives, methane, coal-derived fuels and the like. The reformation of these feedstocks by such processes as catalytic steam reforming, autothermal reforming, or catalytic partial oxidation yield reformate, a mixture of hydrogen and carbon monoxide. Similarly the gasification by various processes of a wide variety of carbonaceous feeds like, but not limited to, bituminous coal, lignite, and petroleum resid or coke yield mixtures of hydrogen and carbon monoxide often containing sulfur compounds with an H to C ratio reflecting the H to C ratio in the feed and the amount of steam (if any) used in the gasification process. The further refinement as by the water gas shift (WGS) reaction to provide high purity hydrogen, requires the use of a catalyst that is both active with respect to the WGS reaction and is tolerant to the sulfur present from the feedstock during the process.

Various metal oxides have found use in chemically reactive systems as catalysts, supports for catalysts, gettering agents and the like. In those usages, their chemical characteristics and morphologies may be important, as well as their ease and economy of manufacture. One area of usage that is of particular interest is in the production of hydrogen from carbonaceous fuels. Carbonaceous fuels are those typically containing at least 0.9 hydrogen per unit of carbon, and may include hetero atoms such as O, N, and/or S. Hydrogen production from these carbonaceous fuels typically requires the conversion of carbon monoxide and water into carbon dioxide and hydrogen through the water gas shift (WGS) reaction. Industrially, iron-chrome catalysts, often promoted, are used as high temperature shift catalysts, and copper-zinc oxide catalysts, often containing alumina and other products, are effective low temperature shift catalysts. These catalysts are less desirable for use in fuel processing systems because they require careful reductive activation and can be irreversibly damaged by air after activation.

Recent studies of automotive exhaust gas "three-way" catalysts (TWC) have described the effectiveness of a component of such catalysts, that being noble metal on cerium oxide, or "ceria" ($CeO_2$), for the water gas shift reaction because of its particular oxygen storing capacity (OSC). Indeed, the ceria may even act as a "co-catalyst" with the noble metal loading in that it, under reducing conditions, acts in concert with the noble metal, providing oxygen from the $CeO_2$ lattice to the noble metal surface to oxidize carbon monoxide and/or hydrocarbons adsorbed and activated on the surface. This is described in greater detail in an article entitled "Studies of the water-gas-shift reaction on ceria-supported Pt, Pd, and Rh: implications for oxygen storage properties", by T. Bunluesin, et al, in Applied Catalysis B: Environmental 15 (1998) at pages 107-114. Another, possibly parallel or possibly alternative, mechanism for the water gas shift reaction over a $CeO_2$ support lattice is described in an article entitled "Reactant-Promoted Reaction Mechanism for Water-Gas Shift Reaction on Rh-Doped $CeO_2$" by T. Shido, et al, in Journal of Catalysis, 141, (1993) at pages 71-81, in which formate is identified as a WGS intermediate produced from CO and surface OH groups.

In many cases the ceria component of these catalysts is not pure ceria, but cerium oxide mixed with zirconium oxide and optionally, other oxides such as rare earth oxides. It has been determined that the reduction/oxidation (redox) behavior of the cerium oxide is enhanced by the presence of $ZrO_2$ and/or selected dopants. Robustness at high temperatures is an essential property of TWC's, and thus, such catalysts do not typically have either sustainable high surface areas, i.e., greater than 100 $m^2/g$, or high metal dispersion (very small metal crystallites), even though such features are generally recognized as desirable in other, lower temperature, catalytic applications.

For mixed-metal oxides that are to be used as co-catalysts, referred to herein as "supports" and which comprise cerium oxide and zirconium and/or hafnium oxide, it is generally desirable that they possess a cubic structure. The cubic structure is generally associated with greater oxygen mobility, and therefore greater catalytic activity. Moreover, the zirconium and/or hafnium provide thermal stability, and thus contribute to the thermal stability and life of a catalyst. Yashima et al., in an article entitled "Diffusionless Tetragonal-Cubic Transformation Temperature in Zirconia Solid Solution" in Journal of American Ceramic Society, 76 [11], 1993, pages 2865-2868, have shown that cubic ceria undergoes a phase transition to tetragonal when doping levels of zirconia are at or above 20 atomic percent. They suggest that above 20 percent zirconia, the oxygen anion lattice distorts into a tetragonal phase, while the cerium and zirconium cations remain in a cubic lattice structure, creating a non-cubic, metastable, pseudo-tetragonal phase lattice. Traditionally, powder X-ray diffraction (PXRD) is used to identify the structure and symmetry of such phases. However, in the case of ceria-zirconia oxides with very small crystallite sizes (i.e., less than 3 nm), the PXRD signal exhibits broadened peaks. Additionally, the signal produced by the oxygen atoms, which is a function of atomic weight, is drowned out by the intense signal produced by the cerium and zirconium cations. Thus any tetragonal distortion, caused by the oxygen atoms shifting in the lattice, goes unnoticed in a PXRD pattern and the resulting pattern appears cubic. In such cases, Raman spectroscopy and X-ray absorption fine structure (EXAFS) can be employed to observe such phase transitions. Yashima et al. have published Raman spectroscopy and EXAFS studies in support of the position taken above. Vlaic et al., in an article entitled "Relationship between the Zirconia-Promoted Reduction in the Rh-Loaded $Ce_{0.5}Zr_{0.5}O_2$ Mixed Oxide and the Zr—O Local Structure" in Journal of Catalysis, 168, (1997) pages 386-392, have shown similar results for a phase transition at 50% zirconia, as determined by Raman spectroscopy and EXAFS.

A variety of synthesis techniques have been used to provide ceria-zirconia mixed oxide materials. These techniques include conventional co-precipitation, homogeneous coprecipitation, the citrate process, and a variety of sol-gel techniques. However, as far as can be determined, the surface areas of the mixed metal oxides resulting from these techniques are typically less than about 130 $m^2/g$. Liquid phase synthesis at relatively low temperatures is preferred, as it allows for the formation of metastable phases and offers the ability to control such properties as surface area, particle size, and pore structure. Typical solution routes have involved two steps, hydration and condensation. It has been generally accepted that the gel matrix formed upon hydration is amorphous and only forms a crystalline structure when the framework undergoes condensation. While hydration occurs at the moment the gelatinous phase is formed from solution, condensation has usually been expected to occur during the aging (maturing), drying and/or calcinations steps. For many mixed metal oxide systems, the detailed conditions under which these steps (such as aging) occur are, and have been, critical parameters in determining the properties of the final product. Thus, a time consuming step such as aging has been essential.

Surface areas as great as 235 $m^2/g$ for such materials have been reported by D Terribile, et al, in an article entitled "The preparation of high surface area CeO2-ZrO2 mixed oxides by a surfactant-assisted approach" appearing in *Catalysis Today* 43 (1998) at pages 79-88, however, the process for their production is complex, sensitive, and time-consuming. The process for making these oxides requires the use of a surfactant and a lengthy aging, or maturing, interval of about 90 hours at 90° C. Moreover, the initial precipitate must be washed repeatedly with water and acetone to remove the free surfactant (cetyltrimethylammonium bromide) before the material can be calcined, thereby contributing to delays and possible other concerns. Still further, the mean particle sizes of these oxides appear to be at least 4-6 nm or more. The pore volume is stated to be about 0.66 $cm^3/g$. This relatively large pore volume per gram is not consistent with that required for a ceria-based mixed metal oxide which, while thermally robust, should tend to maximize both the available surface area in a given reactor volume and the mass transfer characteristics of the overall structure as well as the appropriate reactivity of that surface area, as is desired in the applications under consideration. Assuming the density, D, of this material is about 6.64 $g/cm^3$, the skeleton has a volume, $V_S$, of $1/D$, or about 0.15 $cm^3/g$, such that the total volume, $V_T$, of one gram of this material is the sum of the pore volume, $P_V$, (0.66 $cm^3/gm$) and the skeletal volume, $V_S$, which equals about 0.81 $cm^3/gm$. Hence, 235 $m^2/gm \div 0.81$ $cm^3/gm$ equals about 290 $m^2/cm^3$. Because of the relatively large pore volume, the surface area per unit volume of a material of such density has a reduced value that may not be viewed as optimal.

For use of a mixed-metal oxide in a catalyst application, it is required to be loaded with a metal, such as a noble metal, providing good catalytic activity to the media being processed. While noble metals such as platinum have provided good catalytic activity, it is always desirable to improve the activity, cost, and/or durability of such catalyst metal loadings.

Sulfur tolerance is a critical requirement of the catalyst in promoting durability and avoiding a fast deactivation mechanism associated with sulfate and sulfide formation. This is especially true for relatively large, high pressure installations like coal-to-hydrogen plants. Typically a dry, oxygen-blown bituminous gasifier will produce gas that, after precleaning and before the addition of steam, has the approximate composition of: 34% $H_2$, 61% CO, 2% $CO_2$, 3% others; and 200 ppmv sulfur as $H_2S$ and COS. Steam is added before the WGS step to achieve 3.1$H_2O$/(CO+$CO_2$) ratio. The development of advanced membrane WGS reactors is focusing particularly on membrane-type WGS reactors designed to yield high purity hydrogen permeate and carbon dioxide rich retentate. These membrane-type WGS reactors require catalysts operating across the temperature range of about 300-450° C., at pressures up to 50 atm or more of reformate gas, with a ~3$H_2O$/(CO+$CO_2$) feed ratio and a feed sulfur partial pressure (expressed as $H_2$) of about $5\times10^{-3}$ atm (3.8 torr) at 50 atm (38,000 torr). This sulfur content, then, may be in the range of 1.8 to as much as 70 ppm for a 5-200 ppm feed gas without/before the addition of steam. For economical operation, the conversion rate in terms of moles of CO/mole Pt-sec over a Pt-alloy/mixed metal oxide catalyst needs to be at least 33% of its initial (250 hrs) lined out activity at about 400° C. after 45,000 hours of operation. In this way, if at 400° C. and after 45,000 hours of operation the activity of the catalyst remains at or above 33% of its initial activity, it is then possible to operate near 450° C. and retain nearly the 100% activity.

Until recently, the best commercially available water gas shift catalysts have been the above-mentioned Fe—Cr and Cu/ZnO. These catalysts, however, do not meet the above-stated criteria. Instead they exhibit relatively low volumetric activity, are pyrophoric, and significantly lack sulfur tolerance. However, recent developments have sought to overcome or at least improve upon, one or more of those limitations.

Accordingly, it is a primary object of the present disclosure to provide a catalyst support and catalyst that possess extended activity and durability in WGS reactions under conditions of significant sulfur presence, elevated operating temperatures, and/or elevated pressures associated with the carbon oxides.

It is a further object of the present disclosure to provide a method of making such catalyst support and catalyst.

It is a still further object of the present disclosure to provide the use of such catalyst support and catalyst in a water gas shift reaction.

These and other objects and advantages will be apparent herein.

DISCLOSURE OF INVENTION

In accordance with the present invention, the foregoing objects and advantages have been attained. The aforementioned application Ser. No. 11/605,515 (the '515 application) by Vanderspurt, et al, of which this is a continuation in part, describes a homogeneous ceria-containing mixed-metal oxide, useful as a catalyst support, a co-catalyst and/or a getter, having a relatively large surface area per weight, typically exceeding 150 $m^2/g$ based on an oxide with a skeletal density of about 6.6 $g/cm^3$, a structure of nanocrystallites having small diameters, typically less than 5 nm, and, when aggregated, including pores larger than the nanocrystallites and having diameters in the range of 4 to about 9 nm. The ratio of pore volumes, $V_P$, to skeletal structure volumes, $V_S$, is typically less than about 2.5, and the surface area per unit volume of the oxide material is greater than 320 m²/cm³, for low internal mass transfer resistance and large effective surface area for reaction activity. The mixed metal oxide is ceria-containing, includes Zr and/or Hf, and is made by a unique co-precipitation process. As is well known in the art, catalysts or catalyst support oxides are typically calcined at temperatures above the use temperature to minimize the crystallite growth and subsequent loss of surface area and activity during use. Higher calcining temperature typically lead to larger crystallites.

The '515 application further discloses that a highly dispersed catalyst metal or mixture of metals, typically a noble metal such as Pt, may be loaded on to the mixed metal oxide support from a catalyst metal-containing solution following a selected acid surface treatment of the oxide support. The small crystallite size, typically less than 6 nm and preferably less than 5 nm, is also key to retaining a cubic structure, even for compositions with less than 80% cerium which, as larger crystallites, would have a tetragonal or other structure. It is believed that retaining a cubic structure enhances catalytic performance. Rhenium may be loaded on to the mixed-metal oxide support to increase the activity of the catalyst. The metal-loaded mixed-metal oxide catalyst is applied particularly in water gas shift reactions as associated with fuel processing systems, as for fuel cells.

The '515 application generally relates to a ceria-based mixed-metal oxide material, and more particularly to such material having a relatively high surface area per unit of weight, relatively small crystallite diameters, pore diameters of the crystallites in the aggregate that normally exceed the crystallite diameters, and having an aggregated crystallite morphology that is thermally robust, and that optimizes the available surface area per unit volume, mass transfer characteristics, and the reactivity of that surface area. The invention also relates to the selection of metal constituents in the metal oxide mix with the ceria base, for providing the aforementioned characteristics, and may preferably include one or more of the relatively redox tolerant ions $Zr^{+4}$, $Hf^{+4}$ and $Ti^{+4}$, rare-earth ions such as typical lanthamide ions $La^{+3}$ and $Yb^{+3}$ and non rare-earth metal ions such as $Mo^{6+}$ and $Ta^{5+}$.

The invention further relates to the process(es) for making such ceria-based oxides, to the use of such ceria-based mixed-metal oxides as catalyst supports, co-catalysts, and the like, and to the catalyst metal supported thereby and the process for its manufacture. The invention also relates to the use of such ceria-based mixed metal oxide supports and catalysts particularly in water gas shift (WGS) and/or preferential oxidation (PROX) reactions in fuel processing systems, as for example fuel cells.

There is provided a material of homogeneous cerium-based binary, ternary or quaternary mixed-oxides that are nano-crystalline, have an average crystallite size less than 4 nm after calcinations at 500° C. or less, and which after calcination in air for 1-6 hours, and preferably 2-4 hours, at temperatures in the range of about 2500-600° C., and preferably 3500-500° C., have high (large) surface areas greater than 150 m²/g, a skeletal density of about 6.5 g/cm³, pore volumes of moderate size such that the surface area per unit volume of the porous material is greater than 320 m²/cm³, and preferably greater than 420 m²/cm³, and an average pore diameter of the aggregated (agglomerated) nanocrystallites normally greater than the nanocrystallites, typically being greater than 4 nm but less than about 9 nm in keeping with pore volumes of moderate size. As used herein, the term "homogeneous" refers to the elemental composition of the individual nanocrystallites that reflects the overall elemental composition.

The ceria-based mixed-metal oxide nanocrystalline material described exhibits a fractal morphology, thus leading to a minimization in internal mass transfer resistance. Within the context of a nanoscale material, a pattern formed within an aggregate that is regular and repeating at increasing magnitudes of scale can be considered as fractal. Having a fractal structure eliminates the need to design a catalyst material with very large pore structures. If fractal, the material possesses larger, 100 to 200 nm and micron-sized pores in the aggregate (inter-particle void space, as opposed to intra-particle void space that defines the 4-9 nm pore diameters described above) which provide enough open space for gas molecules to diffuse in and react. By reducing the internal pore diameter (i.e., the inter-particle void space) to a smaller size, the internal surface area may be increased, leading to a larger number of active sites per volume and a thus a higher catalytic activity.

This combination of surface area and average pore diameter translates into relatively low internal mass transfer resistance. However, if that value becomes too small because of excessive pore size and/or volume, the effective number of sites per crystallite aggregate necessarily decreases and the amount of effective surface area per unit reactor volume also decreases. As described earlier, for a porous material of given density, D, the skeletal volume, $V_S$, is 1/D, such that the total volume of a gram of material, $V_T$, is the sum of the pore volume, $V_P$, +skeletal volume, $V_S$. From this, the surface area/gram/$V_T$ yields the surface area per unit volume of material, and it is this value which the invention seeks to maximize. Accordingly, it has been determined that the surface area per unit volume of material should be greater than 320 m²/cm³, and preferably greater than 420 m²/cm³. In this respect, because the pore diameter and pore volume are related, it has been determined that the pore diameter should be moderate and in the range of more than 4 nm but less than 9 nm. Viewed yet another way, it has been determined that the ratio of pore volume, $V_P$, to the particle, or skeletal volume, $V_S$, should not exceed about 2.5.

In addition to the cerium oxide, the other oxides in the mix described in the '515 application are derived from one or more constituents from the group which includes Zr (zirconium), Hf (hafnium), Nb (niobium), Ta (tantalum), La (lanthanum), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium), Lu (lutetium), Mo (molybdenum), W (tungsten), Re (rhenium), Rh (rhodium), Sb (antimony), Bi (bismuth), Ti (titanium), V (vanadium), Mn (manganese), Co (cobalt), Cu (copper), Ga (gallium), Ca (calcium), Sr (strontium), and Ba (barium).

The composition of the bulk mixed metal oxide in accordance with the broadest aspect of the invention may be: cerium, from as little as 30% to 40% to as much as 85%; zirconium or hafnium, or mixtures thereof, between 15% and 60%; titanium from 5 to 45%; and one or more members of the group: Re, Nb, Ta, Mo, W, Rh, Sb, Bi, V, Mn, Co, Cu, Ga, Ca, Sr, Ba, Y, La, Pr, Nd, Sm, Eu, Gd, Tb, Dy, Ho, Er, Tm, Yb, and Lu between 0% and 15% and where all percentages are on a metals-only atomic basis. In accordance with another aspect of the invention, the cerium is between about 40% and 70%, and the zirconium or hafnium, or mixture thereof, is between about 25% and 60% and most preferably is greater than about 45%. Under another aspect of the invention, the cerium may be 60% or more. Moreover, the mixed metal oxide exhibits, via Raman spectroscopy, a cubic structure to the effective exclusion of the tetragonal phase, over all, or most, of the compositional range of interest for the several embodiments. For purposes of the discussion herein, if a constituent in the mixed metal oxide is present in an amount less than about 10% of the total, it may be referred to as a "dopant". It will be understood by those skilled in the art that not all of the listed dopants are equally effective or even desirable for all processes in which these ceria-based oxides may be used. For instance, some dopants such as Ga and Bi may not be desirable in Pt/ceria-zirconia catalysts if for use in WGS reactions.

The process described in the '515 application for making the ceria-based mixed metal oxide materials having the constituents, properties and morphology of the invention avoids the need for using surfactants and lengthy aging steps, and includes the steps of 1) dissolving salts of the cerium and at least one other constituent in at least water to form a dilute metal salt solution; 2) adding urea, either as a solid or aqueous solution; 3) heating the solution of metal salt and urea to near boiling (which may include boiling) to coprecipitate homogeneously a mixed-oxide of the cerium and the one or more other constituent(s) as a gelatinous coprecipitate; 4) optionally maturing, if and when beneficial, the gelatinous coprecipitate in accordance with a thermal schedule; 5) replacing water in the solution with a water miscible, low surface-tension solvent, such as dried 2-propanol; 6) drying the coprecipitate and solvent to remove substantially all of the solvent; and 7) calcining the dried coprecipitate at an effective temperature, typically moderate, for an interval sufficient to remove adsorbed species and strengthen the structure against premature aging. In the dilute metal salt solution, the metal concentration is less than 0.16 mol/L, is preferably less than about 0.02 mol/L, and is most preferably less than about 0.016 mol/L, and the urea concentration is relatively high, being greater than 0.25 mol/L and preferably about 0.5 to 2.0 mol/L. The maturing of the coprecipitate, if even required at all, is accomplished in less than 72 hours, and preferably less than about 24 hours, for example in the range of 3 to 8 hours. Indeed, it has recently been discovered that crystallization may, and often does, occur when the gelatinous coprecipitate is formed, thus further reducing or eliminating the need for maturing the coprecipitate, particularly depending upon the end use application of the material. The calcining of the dried coprecipitate occurs for 1-6 hours, and preferably 2-4 hours, at a heating rate in the range of about 2°-10° C./min with a final calcining temperature in the range of 250°-600° C., and preferably in the range of 350°-500° C.

It has been further discovered that the surface area of the ceria-based mixed-metal oxide material is, to some extent, a function of the gas atmosphere condition under which the material is calcined. A flowing gas is preferable to a static gas condition, air provides an economic source of a flowing gas that provides good results, and calcining the oxide material under flowing $CO_2$, or more preferably under $CO_2$ mixed with a dilute $O_2$ mixture, such as a mixture ranging from 20% $CO_2$; 40% $O_2$; and 40% Ar to 80% $CO_2$; 10% $O_2$; and 10% Ar, or even more preferably under $CO_2$ followed by such a mixture of dilute $O_2$, but without $CO_2$, appears to yield particularly large surface areas, in excess of 250 m²/g.

The ceria-based mixed-metal oxide material of, and made in accordance with, the invention finds particular utility as a catalyst support in a catalytic fuel processing system. A highly dispersed catalyst metal is loaded on the described mixed-metal oxide support to a concentration in the range of 0.1 to 6.0 wt %. The catalyst metal is chosen to have crystallites that are predominantly less than 2.5 nm in size, and preferably less than 2.0 nm. The catalyst metal may typically be a noble metal, with platinum being preferred.

Although the catalytic activity afforded by Pt is relatively high and effective for many processes, it has been discovered that the addition of rhenium (Re) with the loading of the noble metal (e.g., Pt) on the mixed-metal oxide support yields a water gas shift and/or PROX catalyst of particularly high activity. The turnover rate (TOR—the rate per second at which Moles of CO are converted per Mole of Pt) is significantly greater for such catalysts that include Re relative to those that have Pt without Re. The Re is loaded, to a concentration in the range of about 0.25 to 6.0 wt %, on the mixed metal oxide support previously loaded with the catalyst noble metal.

The process for loading the catalyst comprises the steps of 1) surface treating the support in a solution containing an acid from the group consisting of amino acids, hydroxy dicarboxylic acids, hydroxy polycarboxylic acids, and keto polycarboxylic acids; and 2) loading the catalyst metal by submerging the surface-treated support in a solution containing the catalyst metal. The acid used for surface treating the support is preferably malic acid or citric acid. The solution containing the catalyst metal may be a solution of tetraamine-platinum nitrate having about 1 weight percent platinum, 1 weight percent ammonia hydroxide and 15 weight percent 2-propanol, and the surface-treated support is submerged therein for about 2 hours at room temperature, following which it is filtered and dried. The catalyst-loaded support is then calcined for up to 4 hours at a heating rate of about 2° C./min to a calcining temperature in the range of 250°-600° C., and more preferably in the range of 350°-500° C. The resulting catalyst is then used, in accordance with another aspect of the invention, in a water gas shift reactor and/or a preferential oxidizer in a fuel processing system.

In accordance with an aspect of the catalyst loading process, it is desirable to carefully tailor the surface treatment step to the acid being used and the particular composition of the ceria-based mixed-metal oxide support, in order to accomplish the desired surface treatment without excessive degradation of the oxide support material. In this regard, the nanocrystalline mixed metal oxide is first titrated with the acid to be used in order to establish a titration curve having an equivalence point at which the pH stabilizes despite the continued addition of the titrant acid. The titration curve, or a family of such curves for differing acids and/or support materials, is then used to optimize the surface treatment process.

In accordance with a further aspect of the catalyst loading process, there is provided a preferred process for loading the Re on to the noble metal-loaded mixed-metal oxide. The source of the Re is not particularly critical, and may include ammonium perrhenate ($NH_4ReO_4$), perrhenic acid ($HReO_4$), rhenium carbonyl ($Re_2(CO)_{10}$), or the like, with either of the first two mentioned examples having a cost advantage. The noble metal-loaded nanocrystalline mixed metal oxide of the invention is immersed in an appropriate solvent; water or a water containing mixture, is an excellent solvent for the ammonium perrhenate ($NH_4ReO_4$) or perrhenic acid ($HReO_4$), while an organic solvent like tetrahydrofuran is an excellent solvent for rhenium carbonyl ($Re_2(CO)_{10}$) in this application. After an optional degassing or inert gas purging step, the noble metal-loaded, preferably Pt-loaded, nanocrystalline mixed metal oxide is contacted with a hydrogen containing gas to reduce and/or remove chemisorbed oxygen from the surface of the noble metal. Separately, the Re source material in the amount sufficient to add the desired amount of Re to the noble metal-loaded nanocrystalline mixed-metal oxide is combined with the solvent to form a solution. This solution then replaces, or is added to, the solvent contacting the solid such that the noble metal-loaded mixed-metal oxide is contacted with the Re source-containing solution. Contact with the hydrogen-containing gas is continued to reduce the perrhenate ion, which in turn results in a close association of the Re with the Pt. If rhenium carbonyl is used, the interaction with the noble metal under hydrogen is believed to result in the decomposition of the rhenium carbonyl, thus depositing Re on the noble metal. The rhenium carbonyl can be replaced with another reasonably labile rhenium compound/complex or an organometallic rhenium compound free of known or suspected elements deleterious to the catalyst. The mixture is then stirred under the $H_2$ flow for a period of time, followed by a switch to an inert gas. After the hydrogen gas is substantially removed, oxygen or air may be gradually introduced to the inert gas with care being taken that the temperature is maintained below 50° C., preferably below about 30° C. It is also preferable to remove all, or nearly all, of any flammable solvent before the oxygen is introduced. This passivation step is important to prevent pyrophoric ignition upon contact with air, and may be accomplished using alternative equivalent passivation techniques.

It is believed that the relationship described above is due to changes in the catalyst kinetic rate expression with composition, and that these changes reflect among other factors the degree of reduction of the oxide, and the relative surface population of CO, $H_2O$ and $CO_2$ species, or species derived therefrom, on the surface of the nanocrystalline oxide as the composition of the reformate changes. In the nanocrystalline material of the invention where the nanocrystals are only 4 to 6 unit cells in diameter, the change surface species can change the subsurface structure. This in turn impacts the oxide ion conductivity and electronic conductivity. Changes in the oxide composition, such as changes in the Ce to Zr ratio or the addition of dopants magnify or mitigate these changes through their influence of the relative surface populations and on the equilibrium degree of reduction of the oxide imposed by given reformate composition present over the nanocrystalline oxide at a given temperature and noble metal composition and loading.

The aforementioned application Ser. No. 11/091,241 (the '241 application) by Vanderspurt, et al, of which this is also a continuation in part, describes material technology based on cerium-zirconium oxide supports that are nanocrystalline, exhibit large pore volumes and are loaded with a Pt—Re metal alloy to make a highly active, stable catalyst for the WGS reaction. It further describes the inclusion of a dopant, such as tungsten, in the metal oxide support to improve or stabilize high temperature performance. The high temperature and low temperature WGS reactor volumes achieved with these materials are 6-10 times smaller than the Fe—Cr and Cu/ZnO catalysts that they replace. These Ce—Zr oxide-based catalysts display exceptional durability at elevated temperatures (400° C., and above) and in high CO levels.

More particularly, the '241 application describes a homogeneous, nanocrystalline, mixed metal oxide of cerium and at least a first other metal constituent selected from a first group consisting of Zr and Hf and normally being susceptible to oxide ion vacancy ordering and further including at least a second other metal ion, or for brevity, simply "metal", constituent selected to inhibit oxide ion vacancy ordering by its chemical nature with respect to ionic size, electric orbital occupancy and orientation in the oxide lattice under operating conditions. It has been found that a group of metal ion constituents having the desired characteristics for disrupting the oxide vacancy ordering consists of tungsten (W), niobium (Nb), tantalum (Ta), molybdenum (Mo), uranium (Ur) and thorium (Th). Because Ur and Th are environmentally objectionable, the group is practically limited to W, Nb, Ta, and Mo. Of that group, W has been found to be particularly effective as a dopant in attaining the durability of the metal oxide as a WGS catalyst under elevated operating temperatures, though combinations of W with Nb, Ta, and/or Mo are also believed to effective.

The mixed metal oxide has an average crystallite size less than 6 nm, preferably less than 4 nm, and is agglomerated to form a skeletal structure with pores, the average pore diameters being in the range between about 4 nm and 9 nm, preferably between 4.5 nm and 6.5 nm, and normally being greater than the average crystallite size, and wherein the surface area of the skeletal structure per volume of the material of the structure is greater than about 240 $m^2/cm^3$. The mixed metal oxide finds utility as a catalyst in processing carbonaceous fuels, including reformation reactions, partial oxidation, and with particular utility as a catalyst in water gas shift reactions.

While the mixed metal oxide support of the '241 application provides significantly increased durability under conditions of elevated operating temperatures and CO levels, that durability may be compromised somewhat under operating conditions that further include high operating pressures and/or the presence of significant levels of sulfur. Such conditions may be found, for example, in the WGS reactions required and/or contemplated in the processing/gasification of coal and other hydrocarbons to provide hydrogen. A membrane-type reactor may be a preferred reactor for the WGS reaction under these circumstances, though other types of reactors may also be used. In such instances, it is normal to experience operating pressures well in excess of several atmospheres, and perhaps as great as 50 atmospheres or even more. In such instance, the carbon oxide (CO) pressures may be 5-25% of the feed gas pressure. Still further, the sulfur present as $H_2S$ equivalence in the reformate on a dry gas basis before the addition of steam, even after initial sulfur removal, may be in the range of 2-200 ppm or $1 \times 10^2$ atm at 50 atm total pressure before the addition of steam.

In accordance with the invention claimed herein, atomistic modeling suggested that a mixed metal oxide which combined cerium, zirconium or hafnium, and titanium should yield a beneficial composition to act as a catalyst support for use in WGS reactions, particularly under operating conditions of elevated temperatures, significant levels of sulfur, and relatively high pressures of the carbon oxides. More particularly, it was predicted that the inclusion of significant levels of Ti with Ce and Zr and/or Hf would result in a mixed metal oxide having not only the beneficial morphological properties of the metal oxides disclosed in the '515 application and the '241 application, but also a lower sulfur binding energy and a lower CO binding energy than the equivalent oxide composition without titanium to provide enhanced endurance in the presence of significant levels of sulfur and high pressures of CO's. Actual synthesis and testing of such mixed metal oxides under WGS reaction conditions proved this to be the case. The mixed metal oxide(s) of the invention is in the form of a catalyst support for noble metal catalyst material supported thereon, with the combined support and noble metal(s) being termed the catalyst herein.

According to the invention, there is provided a homogeneous, nanocrystalline, mixed metal oxide of at least three metal constituents (x, y, and z), the first metal constituent (x) being cerium, the second metal constituent (y) being selected from a group consisting of Zr, Hf, and a combination of Zr and Hf, and the third metal constituent (z) being Ti, with the three metal constituents comprising at least 80% of the metal constituents of said mixed metal oxide and said Ti being present in a range of 5% to 45% by metals only atomic percent of said mixed metal oxide. The mixed metal oxide has an average crystallite size less than 6 nm and is agglomerated to form a skeletal structure with pores, the average pore diameters being in the range between about 4 nm and 9 nm and normally being greater than the average crystallite size. The surface area of the skeletal structure per volume of the material of the structure is greater than about 240 $m^2/cm^3$.

For the mixed metal oxide, the metals-only atomic percentages of the Ce, the Zr and/or Hf, and the Ti are in the ranges of 30% to 60%, 20% to 50%, and 5% to 45% [55 to 45%??], respectively. Several formulations providing improved results had Ce in the range of 30% to 55%, Zr and/or Hf in the range of 20% to 40%, and Ti in the range of 9% to 42%, respectively.

A further facet of the invention provides a catalyst for facilitating a water gas shift reaction, which catalyst comprises a noble metal on a mixed metal oxide support formulated as disclosed above. The noble metal is preferably Pt in combination with Re, with the weight % of the Pt as a percentage of the total catalyst being in the range of 1:1 to 4:1 of that of the Re, and typically being in the range of 0.25 to 6% of the total catalyst.

The process for making the mixed metal oxide of the aforementioned catalyst includes the steps of a) dissolving suitable compounds of Ce, of Zr and/or Hf, and urea in water to form a first metal salt-urea solution; b) as a pre-step, converting an organic Ti precursor to a meta-stable Ti salt solution in acid; c) combining the meta-stable Ti salt solution in acid with the first metal salt-urea solution; d) heating the combined meta-stable Ti salt solution in water and the first metal salt-urea solution nominally to boiling to crystallize and precipitate the mixed metal oxide; e) recovering the crystallized mixed metal oxide as a solid; f) washing the crystallized mixed metal oxide with water; g) replacing the water existing in the crystallized mixed metal oxide with a water miscible, low surface-tension solvent that displaces water; h) drying the crystallized mixed metal oxide to remove substantially all of any remaining water and solvent; and i) calcining the dried coprecipitate at a moderate temperature below about 600° C. for an interval sufficient to remove adsorbed impurities and stabilize the structure. Steps a), b), and c) above cumulatively comprise the broader step of preparing an aqueous solution of metal salts and urea.

The process for loading the Pt and Re on the mixed metal oxide support includes the steps of a) loading the mixed metal oxide with the Pt; b) calcining the dried Pt-loaded mixed metal oxide support; c) placing the calcined, Pt-loaded mixed metal oxide in a sovent; d) reducing, with dilute $H_2$, the Pt on the surface of the mixed metal oxide; e) introducing a source of Re into the solvent containing the mixed metal oxide with the reduced Pt surface under dilute $H_2$ gas; f) removing the liquid phase of the combined solutions by applying mild heat under the dilute $H_2$ gas to provide the solid Re/Pt-loaded mixed metal oxide; g) passivating the dried Re/Pt-loaded mixed metal oxide solid with house $N_2$ gas which contains small amounts of oxygen; and h) exposure of the dried, passivated Re/Pt-loaded mixed metal oxide solid to ambient air.

A still further facet of the invention is the provision of the above-described Re/Pt-loaded mixed metal oxide catalyst in a water gas shift reactor, and having the reformate of a carbonaceous fuel flowed in reactive contact therewith. The operating temperature in the reactor is in the range of 300° C. to 450° C., and typically is above 350° C. The reformate is at a pressure in the range of 1.8 to 50 atm and typically has sulfur, in the form of $H_2S$, in the range of 2 to 200 ppm or $5 \times 10^{-3}$ atm at 50 atm total pressure. The CO pressures are in the range of 5% to 62% of the dry reformate feed gas. The mixed metal oxide supported catalyst serves to facilitate the conversion of CO to $CO_2$, and its conversion activity in terms of moles of CO/mole Pt-sec is at least 33% of its initial (250 hours) lined out conversion activity at about 400° C. after 45,000 hours of operation.

The foregoing features and advantages of the present invention will become more apparent in light of the following detailed description of exemplary embodiments thereof as illustrated in the accompanying drawings.

BRIEF DESCRIPTION OF DRAWINGS

FIG. 1 is a simplified block diagram of one embodiment of a system for processing carbonaceous fuels and employing a durable catalyst in accordance with the invention;

FIG. 2 is a simplified block diagram of an alternate embodiment of a system for processing carbonaceous fuels and employing a durable catalyst in accordance with the invention;

BEST MODE FOR CARRYING OUT THE INVENTION

Figure 3:
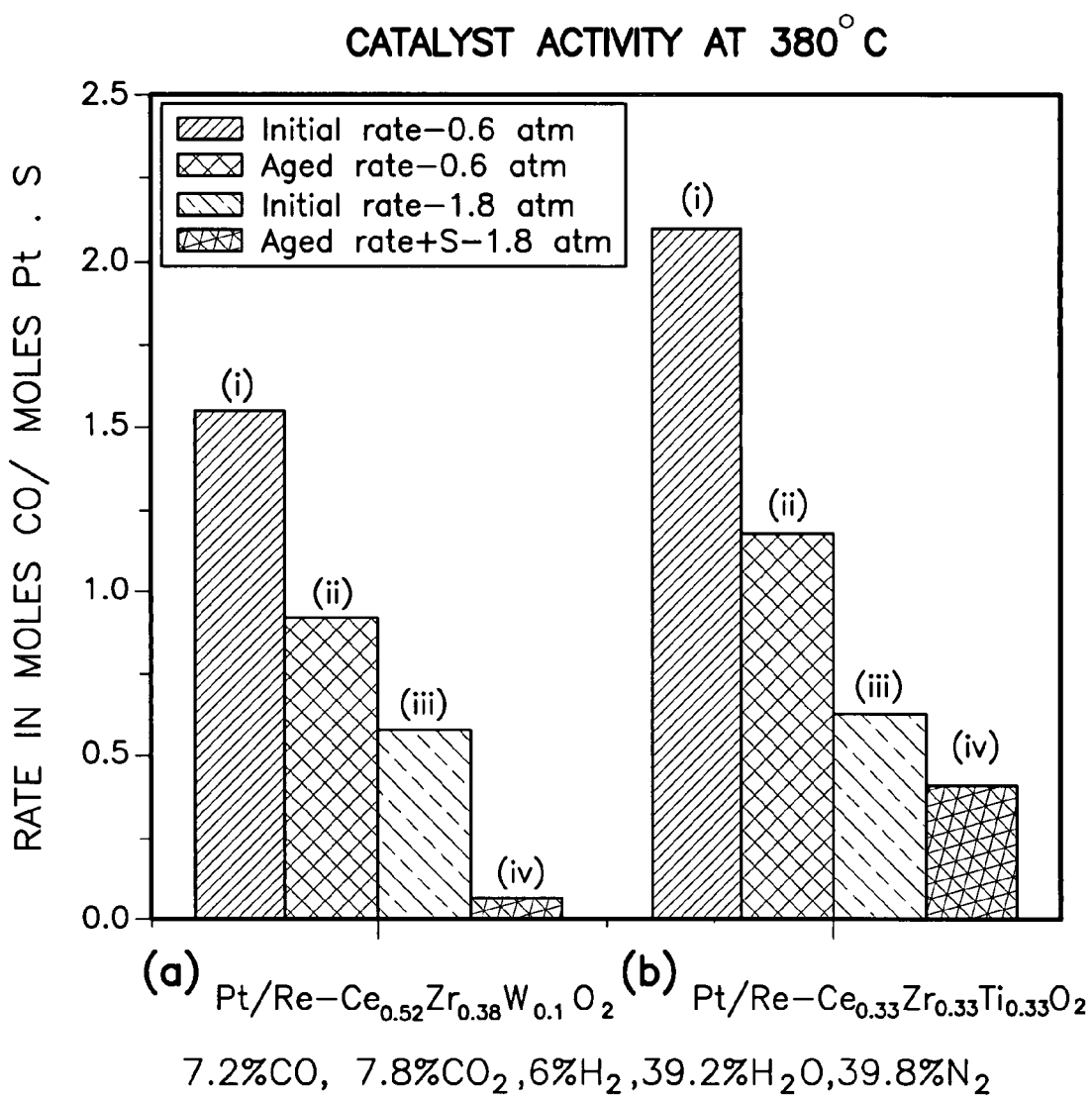
FIG. 3 graphically compares the WGS activity of a Pt/Re—$Ce_{0.52}Zr_{0.38}W_{0.10}O_2$ catalyst with that of a Pt/Re—$Ce_{0.33}Zr_{0.33}Ti_{0.33}O_2$ catalyst of the invention.

This invention relates to mixed metal oxides, and more particularly to ceria-based mixed metal oxide structures of the general type disclosed in the aforementioned '515 and/or '241 applications, for use as catalyst supports and co-catalysts, especially for use in water gas shift reactions and the like. More particularly, the invention relates to a durable catalyst support of mixed metal oxide, to a durable water gas shift catalyst supported by such mixed metal oxide, and to the method of making such support and catalyst. With regard to a description of that mixed metal oxide and resulting catalyst, it is beneficial to include some of the relevant following description from the aforementioned two applications of which this is a continuation-in-part.

The invention relates to a ceria-based mixed-metal oxide material, useful as a catalyst support, a co-catalyst and/or the like, and to the catalyst metal supported thereby in the instance of catalyst usage. The invention also relates to the processes associated with making such ceria-based mixed metal-oxide materials, as supports, catalysts, etc. The invention further relates to use of such ceria-based mixed metal oxides as catalysts, or catalyst supports, in fuel processing systems. As used herein, a supported catalyst, or simply catalyst, comprises the combination of a catalyst support and a catalyst metal dispersed thereon. The catalyst metal may be referred to as being loaded on to the catalyst support, and may, in instances herein, be referred to simply as "the catalyst", depending on the context of usage. Because the ceria-based mixed metal oxide material and process of the invention finds particular utility as a catalyst support, though is not limited to such use, the following discussion of that oxide material and the process by which it is made is in the context of such a support. Thus, reference to "the support" is synonymous with the oxide material of the invention and will typically be used for simplicity.

It is desirable to efficiently maximize the effective surface area of a catalyst support, particularly for use in water gas shift (WGS) reactions and/or preferential oxidation (PROX) reactions to process hydrocarbon feedstocks into hydrogen-rich fuels for fuel cells, in order to make the resulting reaction as efficient as possible. Consequently, the proper combination of relatively high surface area per unit skeletal density coupled with relatively, though not excessively, large pores that minimize internal mass transfer resistance without creating excessive pore volume, results in a highly effective catalyst that increases catalyst efficiency by maximizing the amount of effective surface area within a given reactor volume. By increasing the efficiency of a catalyst in such a reaction, it is possible then to either increase the reaction flow for a given reactor volume or to decrease the reactor volume for a given reaction flow, or a combination of the two. The use of such fuel processing systems in mobile applications places considerable emphasis on reducing size/volume, as will be understood. The improved catalyst support/catalyst/getter of the invention contribute to this objective.

The process(es) and product(s) of the invention involve the formation of high surface area ceria-based mixed-metal oxides as catalyst supports and catalysts of the type particularly suited for use in WGS reactions and PROX reactions, as for the fuel processing system associated with providing a hydrogen-rich fuel supply to a fuel cell. Moreover, the supports and catalysts are formed by processes that are efficient and effective. Consideration will first be given to the formation of the high surface area ceria-based mixed-metal oxide material of the catalyst support, and then to the formation/loading of the catalyst metal on that support.

The support is a homogeneous structure of cerium oxide and at least one other metal oxide constituent that are all nano-crystalline, that is, less than about (<) 4 nm. More specifically, the support of the present invention is at least a ternary mixed metal oxide in which the initial metal is Ce, the secondary metal is Zr, Hf, or a combination of the two, and the ternary metal is Ti. The mixed metal oxide preferably exhibits a cubic, or at least predominantly cubic, structure, rather than the tetragonal structure that might otherwise be expected. Whereas the mixed metal oxide formulations of the aforementioned '515 and/or '241 applications specifically disclose the inclusion of Ce and Zr and/or Hf, and the '515 application broadly recites the possible inclusion of Ti as a ternary or quaternary metal, that latter metal is mentioned as a possible constituent within a very large group of such constituents without identifying the unique properties it provides as described and claimed in the present invention.

In the context of the present invention, initial efforts focused on atomistic modeling of elements and combinations that might have relatively low binding energies with respect to carbon monoxide (CO) and $H_2S$, with the belief that the inclusion of components with such properties in the mixed metal oxide support of the WGS catalyst would increase its durability in the presence of those gaseous constituents. In that regard, the following Tables reveal the binding energies of Ti vs W with respect to CO and $H_2S$ (and water), both with respect to supports containing those metal oxides (Table 1) and also to such supports including Pt dispersed thereon (Table 2). Reference to Table 1 reveals:

TABLE 1

| | Binding Energy | | |
|---|---|---|---|
| | CO, eV | $H_2O$, eV | $H_2S$, eV |
| TiO2 - Anatase | −0.32 | −0.64 | −1.93 |
| TiO2 - Rutile | −0.09 | −1.16 | −0.90 |

TABLE 1-continued

| | Binding Energy | | |
|---|---|---|---|
| | CO, eV | $H_2O$, eV | $H_2S$, eV |
| $Ti_{0.96}W_{0.04}O_2$ | −0.34 | −0.72 | −2.09 |
| $Ce_{0.5}Zr_{0.4}W_{0.1}O_2$ | −0.63 | −0.74 | −2.14 |
| $Ce_{0.5}Zr_{0.4}Ti_{0.1}O_2$ | −0.97 | −1.01 | −2.43 |
| $Ce_{0.33}Zr_{0.33}Ti_{0.33}O_2$ | −0.01 | −0.83 | −0.29 |

Reference to Table 2 reveals:

TABLE 2

| | Binding Energy | |
|---|---|---|
| | CO, eV | H2S, eV |
| $Pt/TiO_2$ - Anatase | −1.67 | −2.37 |
| $Pt/Ti_{0.96}W_{0.04}O_2$ | −0.97 | −2.02 |
| $Pt/Ce_{0.5}Zr_{0.4}W_{0.1}O_2$ | −1.74 | −3.66 |
| $Pt/Ce_{0.33}Zr_{0.33}Ti_{0.33}O_2$ | −0.32 | −1.84 |

The Tables 1 and 2 suggest that a mixed metal oxide of Ce and Zr and further including Ti will have a desirable, relatively low binding energy with respect to CO and $H_2S$, thus making it attractive as a third metal constituent. Additional empirical testing described hereinafter serves to establish a suitable range of Ti content in the support to afford the improved durability with respect to high CO and $H_2S$ levels under high operating pressures.

It will be understood and appreciated that by using the process of the invention, these cerium-based mixed-metal oxides form support structures that have a nano-crystalline structure that, on average, is less than about 4 nm, as determined by powder x-ray diffraction line broadening; a high B.E.T. surface area that exceeds 150 $m^2/g$ after calcination at about 400° C. for about 4 hours, and typically is about 180 $m^2/g$ or more; and relatively large pores as determined by nitrogen adsorption, the average pore size as determined by the maximum in the pore size distribution curve for the material being greater than 4 nm, and typically 5 nm or greater, to about 9 nm, and thus normally larger than the crystallite size. These characteristics tend to maximize and optimize the surface for interaction with the gas phase, by combining relatively high surface area per unit skeletal density with relatively, though not excessively, large pores that minimize internal mass transfer resistance without creating excessive pore volume, to result in a highly effective catalyst that increases catalyst efficiency by maximizing the amount of effective surface area within a given reactor volume. These characteristics also make the material very well suited for the support of small, i.e., less than about 2.0-2.5 nm, metal clusters or crystallites. Thus the ceria-based mixed-metal oxide with this morphology and bearing these small metal particles on its surface is ideally suited for use as a catalyst in the WGS reaction where, it is reported, the CO chemisorbed on the surface of the metal particles undergoes nucleophilic attack by oxide ions from the mixed metal oxide, converting it to $CO_2$ and reducing the mixed metal oxide which is reoxidized by the reaction of the oxide with water, a reaction that liberates hydrogen.

Referring to the process by which supports having the aforementioned structure and characteristics are formed, a novel method of synthesis by homogeneous coprecipitation is used. While homogeneous coprecipitation methods are known, including the use of urea as in the present invention, the steps and parameters of the process of the invention are specific and unique, and yield the improved ceria-based mixed-metal oxide support in a novel and efficient manner. The synthesis method used in the invention has the advantage of relatively short, or even no, aging, or maturing, time, the avoidance of expensive reagents like alcoxides, and the avoidance of super-critical solvent removal.

An important part of the support-forming method is that the coprecipitation is performed in a very dilute metal salt solution, which is believed to prevent particles/nuclei from growing to a larger size (i.e., >4 nm). The total metal concentration in the solution is less than 0.16 mol/L, is preferably less than about 0.02 mol/L, and most preferably, is less than about 0.016 mol/L. The solution, in addition to the metal salt(s), also includes urea. Another important aspect is that the urea concentration must be high, at least 0.1 mol/L, and preferably being about 0.5-2 mol/L. The solution, containing the appropriate amounts of metallic salt and urea to attain the requisite concentrations, is heated to near boiling, which may include boiling, while stirring, to cause the hydrolysis of the urea and thus the reaction of the soluble metal ions with the urea hydroloysis products to form a cloudy suspension of nanocrystals. The coprecipitation of the various metal oxides quickly begins and is completed, typically in less than one minute. The resulting coprecipitate is gelatinous. While stirring is continued, the mixture of coprecipitate (hereinafter referred to sometimes simply as "precipitate") and solution may optionally be aged, or matured, though is not necessary for many applications. To the extent required at all, the step of aging the coprecipitate mixture is relatively fast, being less than 72 hours, preferably less than about 24 hours, and most typically being in the range of 3 to 8 hours or less. The aging step comprises heating, or maintaining the heating of, the mixture to, or near, its boiling temperature for about, for example, 7 hours, and then continuing to stir and allowing to cool to ambient room temperature for an additional period of, for example, about 16 hours. The continued heating after the formation of the nanocrystalline suspension is neither particularly helpful nor harmful, nor is an extended period of stirring during and after cool down. Indeed, it has recently been discovered that crystallization may, and often does, occur when the gelatinous coprecipitate is formed, thus further reducing or eliminating the need for maturing the coprecipitate, particularly depending upon the use application of the material.

The mixture is then filtered, and the resulting filter cake is washed, typically twice, with de-ionized water at about boiling temperature. Importantly, the water associated with the filter cake is then replaced with a water-miscible, low surface-tension solvent. This serves to reduce the capillary pressure exerted by the solvent on the solid oxide during a subsequent drying step. The water-miscible, low surface-tension solvent may be an alcohol with 4 carbons or less, and preferably 3 carbons or less, or a ketone or an ester, each with 4 carbons or less. A preferred such solvent is dried 2-propanol, with other examples including propanone (acetone), methyl ethyl ketone, and 1-propanol. This may be accomplished in various ways, but preferred herein is first washing the filter cake several times with the water-miscible, low surface-tension solvent at room temperature, and then mixing fresh, dried, water-miscible, low surface-tension solvent with the precipitate and heating to reflux for about 45 minutes. The need for the reflux wash will be determined by the effectiveness of the prior lower temperature washes in replacing the water. The washed precipitate may be freed from excess solvent by any of the several means known in the art including filtration, centrifugation, spray drying, etc. Alternatively, the washed precipitate may be effectively suspended in a sufficient amount of liquid and that suspension used either directly or after the addition of a binder or binder components, to wash coat monoliths, foams, and/or other substrate objects. In a more concentrated form, the washed precipitate may be extruded, as by a syringe or the like.

The resulting coating or extrudate then undergoes a drying step to remove the remaining solvent. This may be accomplished by any of the variety of means known in the art, but vacuum oven drying at about 70° C. for about 3 hours is effective, and the extrudate may then remain in the oven at that same temperature, but without vacuum, for an additional period that may be about 16 hours.

Following drying, the oxide, or the aforementioned formed and dried mixed metal oxide may be calcined at 250° C.-600° C., and preferably about 350° C.-500° C., for an interval sufficient to remove adsorbed species and strengthen the structure against premature aging. Lower temperatures typically mean more physisorbed and chemisorbed solvent and/or carbonates, while higher temperatures and longer times mean the reverse. In an exemplary process, the calcining required is about 4 hours with a heating rate of about 2° C./minute. The calcining process typically begins at a temperature of about 70° C., and the calcining temperature selected is based on a balance of increased surface area at the lower end of the time/temperature range vs. assured removal of contaminants at the upper end.

Following calcination, the precipitate possesses the properties desired of the support of the invention, to wit, homogeneous mixed oxides of at least cerium, zirconium and/or hafnium, titanium, that are nano-crystalline, typically less than 4 nm for calcinations at 500° C. or less, and that collectively define a structure having large pores, typically of more than 4 nm, in the range of more than 4 nm to less than about 9 nm, and thereby have a large surface area greater than 150 $m^2/g$, typically 180 $m^2/g$ or greater. This combination of surface area and average pore diameter translates into relatively low internal mass transfer resistance. However, if that value becomes too small because of excessive pore size and/or volume, the effective number of sites per crystallite aggregate necessarily decreases and the amount of effective surface area per unit reactor volume also decreases. For a porous material of given density, D, the skeletal volume, $V_S$, is 1/D, such that the total volume of a gram of material, $V_T$, is the sum of the pore volume, $V_P$, +skeletal volume, $V_S$. From this, the surface area/gram/$V_T$ yields the surface area per unit volume of material, and it is this value which the invention seeks to maximize. Accordingly, it has been determined that the surface area per unit volume of material should be greater than 320 $m^2/cm^3$, and preferably greater than 420 $m^2/cm^3$. Viewed yet another way, it has been determined that the ratio of pore volume, $V_P$, to the particle, or skeletal volume, $V_S$, should not exceed about 2.5. It is important to realize that skeletal volume is more appropriate than mass when dealing with a high skeletal or crystallite density like $CeO_2$, (7.132 $g/cm^3$). For example, a given surface area/g of $CeO_2$ will translate to about 2½ times the surface area, $m^2$, per unit volume, $cm^3$, than for the same given surface area/g of a the less-dense catalyst support material $SiO_2$, which has a crystallite density of 2.65 $g/cm^3$.

Attention is now given to the facet of the invention concerned with loading a highly dispersed catalyst metal on the mixed metal oxide support just described, including the associated process and the resulting product. Although the following discussion and examples will use Pt (platinum) as the catalyst metal loaded on the support, it will be understood that other metals, and particularly noble metals, are well-suited alternatives to Pt, such as Pd, Rh, Ir, Ru, and Os, as well as alloys or mixed metal clusters containing noble metal including Group 1B metals and/or Re. Further attention will be given hereinafter to the advantage of including Re with Pt. The highly dispersed platinum, that is, Pt crystallites that are typically less than 3 nm in diameter, preferably less than 2.5 nm in diameter, and most preferably less than 2 nm in diameter, as applied to the mixed-metal oxide support of the invention and in the manner and formulation of the invention, has a concentration in the range from about 0.1 to about 6.0% by weight, as metal, based on the final weight of the dried oxide support. While "low" metal loadings below about 1.0 wt % may be acceptable or even desirable in some situations, such as catalyst use at temperatures above 400° C., high loadings of about 4 to 6 wt % may be needed to obtain the desired catalytic activity and life time at lower temperatures, for instance 200° C. Such loading of a catalyst, such as Pt, on a large surface area, ceria-based support results in a catalyst that is particularly effective and efficient for use in WGS and PROX reactions.

To load the highly dispersed platinum on the support, several steps are involved, two of which are particularly important to the invention. Those important steps include, firstly, surface treating the ceria-based support and secondly, selecting an/the appropriate formulation for loading the support. A preliminary step, which may also be accomplished as a final step in the formation of the support, involves forming the oxide into a suitable form. This form may be that of a fine powder (<200 mesh), 50 to 100 mesh granules, extrudates, pellets, with or without added binder extrusion aides, etc., or a wash-coat or other coating on a ceramic or metallic monolith, foam or wire mesh, again with or without a suitable binder.

The 50-200 mesh, ceria-based mixed-metal oxide support particles, preparatory to being metal-loaded, undergo surface treatment by being heated in an acid solution containing one or more acids from the group consisting of amino acids, hydroxy dicarboxylic acids, hydroxy polycarboxylic acids and keto carboxylic acids, of which citric acid from the hydroxy polycarboxylic acid group and malic acid from the hydroxy dicarboxylic acid group are preferred, with malic acid being particularly preferred. These acids are selected to provide a mild reaction and serve to react with the oxide surface, forming sites that bind noble metal-containing cations such as $[Pt(NH_3)_4]^{+2}$. It is believed that these sites are sufficiently separated from each other as to yield, after either calcinations, calcinations and reduction, or reduction, very high noble metal dispersion, that is noble metal particles typically less than 2.5 nm. The support particles are heated in an alcohol solution, typically of ethanol, containing a selected acid, such as malic or citric acid, at about 50° C. for 2-3 hours. The support particles are then rinsed with ethanol until a pH greater than 4 is attained.

In accordance with an aspect of the catalyst loading process of the invention, it has been found to be particularly desirable to carefully tailor the surface treating (etch) step to the acid being used and the particular composition of the ceria-based mixed-metal oxide support, in order to accomplish the desired etch without excessive degradation of the oxide support material. This is particularly desirable for obtaining accurate, reliable and reproducible catalyst loadings on nanocrystalline complex mixed metal oxides with surface areas greater than 200 m²/g. In this regard, the nanocrystalline mixed metal oxide is first titrated with the acid to be used in order to establish a titration curve having an equivalence point at which the pH stabilizes despite the continued addition of the titrant acid. The titration curve, or a family of such curves for differing acids and/or support materials, is then used to optimize the etch process by selecting the quantity of acid determined by the equivalence point.

After the surface treatment rinse, the support particles are submerged or immersed in a suitable solution containing the catalyst metal, in this instance a tetraamineplatinum (II) nitrate solution, ammonia hydroxide and propanol, for 2-3 hours at room temperature. Tetraamineplatinum (II) nitrate or analogous salts of other noble metals are usually chosen because they provide sufficiently stable, soluble noble metal cations to react with the treated surface, are halogen or sulfur free, are available at a reasonable cost, and on further treatment such as calcination smoothly decompose leaving no unwanted residue. Tetraamineplatinum (II) chloride, bromide, etc. would work but they contain halogens. For some noble metals, like Pd, other ligands like ethanolamine can be substituted for ammonia, and the resulting water containing solution contains a mixture of complexes of the type M(II) $[(NH_3)_{4-(x+n)}(\text{ethanolamine})_x(H_2O)_n]$ where x+n is equal to or less than 4. Care must also be taken that the noble metal salt chosen doesn't undergo either spontaneous or light induced redox reactions causing the noble metal to come out of solution.

Thereafter, the support particles are filtered through a 10 μm membrane filter and vacuum dried overnight (about 16 hours). Finally, the dried and metal-loaded catalyst support is calcined at a temperature in the range of 3500-500° C. for about 3-4 hours at a heating rate of about 2° C./min, to provide the finished catalyst. The essence of this phase of the process is to convert the metal-loaded protocatalyst to a stable form, through some appropriate combination of drying, calcining and/or reduction.

Although the catalytic activity afforded by Pt is relatively high and effective for many processes, it has been discovered that the addition of rhenium (Re) with the loading of the noble metal (e.g., Pt) on the mixed-metal oxide support yields a water gas shift and/or PROX catalyst of particularly high activity. The turnover rate (TOR—the rate per second at which Moles of CO are converted per Mole of Pt) is significantly greater for such catalysts that include Re relative to those that have Pt without Re. The Re is loaded, to a concentration in the range of 0.5 to 6.0 wt %, on the mixed metal oxide support previously loaded with the catalyst noble metal.

An aspect of the invention provides a preferred process for loading the Re on to the noble metal-loaded mixed-metal oxide. The source of the Re is not particularly critical, and may include ammonium perrhenate ($NH_4ReO_4$), perrhenic acid ($HReO_4$), rhenium carbonyl ($Re_2(CO)_{10}$) or the like, with either of the first two mentioned examples having a cost advantage. The noble metal-loaded nanocrystalline mixed-metal oxide of the invention is immersed in an appropriate solvent; water or a water containing mixture, is an excellent solvent for the ammonium perrhenate ($NH_4ReO_4$) or perrhenic acid ($HReO_4$), while an organic solvent like tetrahydrofuran is an excellent solvent for rhenium carbonyl ($Re_2(CO)_{10}$) in this application. After an optional degassing or inert gas purging step, the noble metal-loaded, preferably Pt-loaded, nanocrystalline mixed metal oxide is contacted with a hydrogen containing gas to reduce and/or remove chemisorbed oxygen from the surface of the noble metal. Separately, the Re source material in the amount sufficient to add the desired amount of Re to the noble metal-loaded nanocrystalline mixed-metal oxide is combined with the solvent to form a solution. This solution then replaces, or is added to, the solvent contacting the solid such that the noble metal-loaded mixed-metal oxide is contacted with the Re source-containing solution. Contact with the hydrogen-containing gas is continued to reduce the perrhenate ion, which in turn results in a close association of the Re with the Pt. If rhenium carbonyl is used, the interaction with the noble metal under hydrogen is believed to result in the decomposition of the rhenium carbonyl, thus depositing Re on the noble metal. As one skilled in the art will recognize, the rhenium carbonyl can be replaced with another reasonably labile rhenium compound/complex or an organometallic rhenium compound free of known or suspected elements deleterious to the catalyst. The mixture is stirred under the $H_2$ flow for a period, followed by a switch to an inert gas. After the hydrogen gas is substantially removed, oxygen or air may be gradually introduced to the inert gas with care being taken that the temperature is maintained below 50° C., preferably below about 30° C. It is also preferable to remove all, or nearly all, of any flammable solvent before the oxygen is introduced. This passivation step is important to prevent pyrophoric ignition upon contact with air, and may be accomplished using alternative equivalent passivation techniques.

Following are 3 examples (Examples 1-3) in which the above described process for synthesizing the mixed metal oxide support is described in detail, firstly (Example 1) for a mixed metal oxide of CeZrWO in accordance with the '241 application and next (Examples 2 and 3) for 2 formulations of a mixed metal oxide of CeZrTiO in accordance with the present invention. Also following are 3 further examples (Examples 4-6) in which the above described process for loading the Pt and Re catalyst metals on the supports is described in detail, firstly (Example 4) on the CeZrWO support of Example 1 and next (Examples 5 and 6) on the CeZrTiO supports of Examples 2 and 3. The CeZrWO supports/catalysts of Examples 1 and 4 are prepared for the purpose of performance comparison with the CeZrTiO supports/catalysts.

Example 1

$Ce_{0.50}Zr_{0.40}W_{0.10}O_2$ Support Synthesis

The following example demonstrates the method of preparing a nanocrystalline support material having the composition $Ce_{0.50}Zr_{0.40}W_{0.10}O_2$ (STWGS3-02). In a 12 L vessel on top of a stirring hot plate equipped with a large stir bar, 36.3 g of $(NH_4)_2Ce(NO_3)_6$ (0.0625 mol of Ce), 13.7 g of ZrO$(NO_3)_2 \cdot xH_2O$ (0.0500 mol Zr), 288 g of urea and 8,800 mL of deionized water are combined (Solution A). Separately, 3.55 g of $(NH_4)_2WO_4$ was combined with 800 mL of deionized water and heated to 90° C. (Solution B). Solution A was heated to just below its boiling temperature. At this time, the urea began to hydrolyze and $CO_2$ gas was evolved. Solution B was then slowly added to Solution A, and a slight turbidity was observed, followed by dissolution/clearing of the solution. Once the addition was complete, the temperature of the solution was raised to 100° C. to crystallize/coprecipitate the oxide from solution. The time between the W addition and the oxide precipitation was kept to a minimum to avoid excessive exposure of the $(NH_4)_2WO_4$ to the acidic pH. Immediately after the oxide crystallization/precipitation was observed, the mixture was removed from the heat and cooled to room temperature. The mixture was filtered using a Buchner funnel. The resulting filter cake was washed twice with 1,000 mL of de-ionized water at boiling temperature while stirring for 10 minutes, and then filtering again after each washing step. The filter cake was then washed three times with 200 mL of dried 2-propanol while inside the Buchner funnel and then mixed with 800 mL of dried 2-propanol and heated to reflux for 45 minutes. The solution was filtered once again before being extruded through a syringe. The extrudates were dried in a vacuum oven at 70° C. overnight, comminuted through a 30 mesh sieve, calcined at 380° C. for 4 hours under a 90% $CO_2$/10% $O_2$ environment with a heating ramp of 10° C./min. After calcination, the surface area of the oxide with an estimated skeletal density of 7.02 g g/cm$^3$ was 234 m$^2$/g. The specific surface area per skeletal volume was 1064 m$^2$/cm$^3$, with a pore volume of 0.29 cm$^3$/g and an average pore diameter of 5.0 nm.

Example 2

$Ce_{0.50}Zr_{040}Ti_{0.10}O_2$ Support Synthesis

The following example demonstrates the method of preparing a nanocrystalline support material having the composition $Ce_{0.50}Zr_{0.40}Ti_{0.10}O_2$ (STWGS3-03). In a 12 L vessel on top of a stirring hot plate equipped with a large stir bar, 38.2 g of $(NH_4)_2Ce(NO_3)_6$ (0.0698 mol of Ce), 15.3 g of ZrO$(NO_3)_2 \cdot xH_2O$ (0.0558 mol Zr), 1,152 g of urea and 9,300 mL of deionized water were added. The combined mixture was stirred at room temperature until all the solids are fully dissolved. Because titanium does not exist in any of these forms as a stable salt, a pre-step to the process was implemented in which an organic titanium precursor, specifically in this case titanium isopropoxide, is converted to titanium oxynitrate by acidifying it in a 0.5M nitric acid solution under a flowing stream of nitrogen where the ratio of moles of titanium to moles of nitric acid is 1:2. To achieve an oxide support with the greatest surface area and smallest crystallite size, which is a desirable feature in meeting the water gas shift activity requirements, the titanium oxynitrate solution must be regarded as meta-stable. As such, it is prepared in only enough quantity to support a single synthesis. Therefor, separately, in a 3-neck round bottom flask equipped with a stir bar, a nitrogen purge line and an outlet bubbler, 10 mL of 3M $HNO_3$ was added. The flask was placed in an ice bath on top of a stir plate and the acid solution was left to chill. Separately, in a nitrogen purged glovebox, >4 mL of titanium isopropoxide [$(CH_3)_2CHO]_4Ti$ (0.01395 mol Ti) was transferred into a 30 mL borosilicate vial and capped with a crimp top lid using a hand crimper. This prevented any exposure of oxygen to the [$(CH_3)_2CHO]_4Ti$ which is moderately air sensitive. The crimped vial was then transferred outside the glovebox and using a 10 mL syringe, the 4 mL of [$(CH_3)_2CHO]_4Ti$ was withdrawn and added slowly to the 3M $HNO_3$ solution. Upon exposure of the [$(CH_3)_2CHO]_4Ti$ to the $HNO_3$, a white precipitate formed. Upon further stirring, the white precipitate redissolved forming a clear to yellow solution. This solution was then diluted with de-ionized water to 300 mL and transferred into the original, 12 L vessel. The combined solution was then heated to 100° C. or boiling, upon which precipitation of the oxide occurred due to hydrolysis/decomposition of the urea. The precipitated oxide was removed from the heat and cooled to room temperature. The mixture was filtered using a Buchner funnel. The resulting filter case was washed twice with 1,000 mL of de-ionized water at boiling temperature while stirring for 10 minutes, and then filtering again after each washing step. The filter cake was then washed three times with 200 mL of dried 2-propanol while inside the Buchner funnel and then mixed with 800 mL of dried 2-propanol and heated to reflux for 45 minutes. The solution was filtered once again before being extruded through a syringe. The extrudates were dried in a vacuum oven at 70° C. overnight, comminuted through a 30 mesh sieve, calcined at 380° C. for 4 hours under a 90% $CO_2$/10% $O_2$ environment with a heating ramp of 10° C./min. After calcination, the surface area of the oxide with an estimated skeletal density of 5.662 g/cm$^3$ was 240 m$^2$/g. The specific surface area per skeletal volume was 1359 m$^2$/cm$^3$, with a pore volume of 0.33 cm$^3$/g and an average pore diameter of 5.5 nm.

Example 3

$Ce_{0.33}Zr_{0.33}Ti_{0.33}O_2$ Support Synthesis

The following example demonstrates the method of preparing a nanocrystalline support material having the composition $Ce_{0.33}Zr_{0.33}Ti_{0.33}O_2$ (STWGS3-01). In a 12 L vessel on top of a stirring hot plate equipped with a large stir bar, 29.2 g of $(NH_4)_2Ce(NO_3)_6$ (0.0533 mol of Ce), 14.8 g of ZrO$(NO_3)_2 \cdot xH_2O$ (0.0533 mol Zr), 1,152 g of urea and 9,300 mL of deionized water were added. The combined mixture was stirred at room temperature until all the solids are fully dissolved. Separately, in a 3-neck round bottom flask equipped with a stir bar, a nitrogen purge line and an outlet bubbler, 36 mL of 3M HNO$_3$ was added. The flask was placed in an ice bath on top of a stir plate and the acid solution was left to chill. Separately, in a nitrogen purged glovebox, >16 mL of $[(CH_3)_2CHO]_4Ti$ (0.0533 mol Ti) was transferred into a 30 mL borosilicate vial and capped with a crimp top lid using a hand crimper. This prevented any exposure of oxygen to the $[(CH_3)_2CHO]_4Ti$ which is moderately air sensitive. The crimped vial was then transferred outside the glovebox and using a 10 mL syringe, the 16 mL of $[(CH_3)_2CHO]_4Ti$ was withdrawn and added slowly to the 3M HNO$_3$ solution. Upon exposure of the $[(CH_3)_2CHO]_4Ti$ to the HNO$_3$, a white precipitate formed. Upon further stirring, the white precipitate redissolved forming a clear to yellow solution. This solution was then diluted with de-ionized water to 300 mL and transferred into the original, 12 L vessel. The combined solution was then heated to 100° C. or boiling, upon which precipitation of the oxide occurred due to hydrolysis/decomposition of the urea. The precipitated oxide was removed from the heat and cooled to room temperature. The mixture was filtered using a Buchner funnel. The resulting filter case was washed twice with 1,000 mL of de-ionized water at boiling temperature while stirring for 10 minutes, and then filtering again after each washing step. The filter cake was then washed three times with 200 mL of dried 2-propanol while inside the Buchner funnel and then mixed with 800 mL of dried 2-propanol and heated to reflux for 45 minutes. The solution was filtered once again before being extruded through a syringe. The extrudates were dried in a vacuum oven at 70° C. overnight, comminuted through a 30 mesh sieve, calcined at 380° C. for 4 hours under a 90% CO$_2$/10% O$_2$ environment with a heating ramp of 10° C./min. After calcination, the surface area of the oxide with an estimated skeletal density of 5.47 g/cm$^3$ was 280 m$^2$/g. The specific surface area per skeletal volume was 1530 m$^2$/cm$^3$, with a pore volume of 0.44 cm$^3$/g and an average pore diameter of 6.3 nm. The crystal size was approximately 2.4 nm. Based only on x-ray diffraction, the phase of the material was predominantly cubic, being about 70% cubic and 21% tetragonal. This is significant considering that zirconia and titania, separately, do not prefer the cubic structure, yet together they typically comprise the majority (e.g., 66%) of the final composition. It is believed the very small crystallite size obtained is what allows this to occur.

Example 4

$Ce_{0.50}Zr_{0.40}W_{0.10}O_2$ Metal Loading

The following example demonstrates the platinum and rhenium loading of a nanocrystalline support material having the composition $Ce_{0.50}Zr_{0.40}W_{0.10}O_2$, which was prepared according to the method described in Example 1. The calcined material was comminuted to a 80-120 mesh size. In a 40 mL vial, 2.85 of the comminuted powder was weighed out and 17 ml (6 mL/g) of 0.20M malic acid/ethanol solution was added. The vial was sealed and placed inside a 50° C. oven for 1 hour with periodic mixing. The catalyst support is then filtered and washed thoroughly with ethanol. After the rinse, the catalyst was dried and immersed in 6.84 g of 1.00 wt % platinum solution by weight for 2 hours at room temperature. The platinum solution consists of 1.91 g of tetraamine platinum nitrate, 2.65 mL of ammonium hydroxide (0.0275 mL/g Pt compound) and the balance a 15 wt % isopropanol in water solution to make up a total of 96.5 g. After the 2 hour immersion, the supernant solution was pushed through a 0.02 μm Whatman filter material and analyzed by ICP. The solid material was filtered through a 10 μm Teflon membrane filter, washed with acetone and vacuum-dried overnight at 70° C. The platinum loaded catalyst was then calcined at 450° C. in static air for 4 hours, with a heating ramp of 10° C./min. ICP results on the supernant solution, compared to the original platinum solution, indicated a final platinum loading of 0.90 wt %.

After Pt loading, 2.64 g of the catalyst product was weighed out and placed in a 50 mL round bottom flask with 20 mL of tetrahydrofuran (THF) solution equipped with a gas inlet and outlet and bubbled with 4% H$_2$ (balance N$_2$) for 1 hour to pre-reduce the platinum already loaded on the oxide support. Separately, 0.021 of Re$_2$(CO)$_{10}$ was added to 20 mL of THF in a 40 mL vial and warmed to ensure full dissolution. The rhenium solution was then added to the 50 mL round bottom flask using a syringe needle. The mixture was allowed to stir while bubbling 4% H$_2$ (balance N$_2$) for 2 hours or until the solvent completely evaporated. The gas mixture was then switched from 4% H$_2$ (balance N$_2$) to 100% nitrogen to passivate the surface. Assuming all of the rhenium metal was delivered to the catalyst, the final Re loading was 0.45 wt %

Example 5

$Ce_{0.50}Zr_{0.40}Ti_{0.10}O_2$ Metal Loading

The following example demonstrates the platinum and rhenium loading of a nanocrystalline support material having the composition $Ce_{0.50}Zr_{0.40}Ti_{0.10}O_2$, which was prepared according to the method described in Example 2. The calcined material was comminuted to a 80-120 mesh size. In a 40 mL vial, 1.30 g of the comminuted powder was weighed out and 13 ml (10 mL/g) of 0.20M malic acid/ethanol solution was added. The vial was sealed and placed inside a 50° C. oven for 1 hour with periodic mixing. The catalyst support is then filtered and washed thoroughly with ethanol. After the rinse, the catalyst was dried and immersed in 4.94 g of 1.00 wt % platinum solution by weight for 2 hours at room temperature. The platinum solution consists of 0.58 g of tetraamine platinum nitrate, 0.81 mL of ammonium hydroxide (0.0275 mL/g Pt compound) and the balance a 15 wt % isopropanol in water solution to make up a total of 29.4 g. After the 2 hour immersion, the supernant solution was pushed through a 0.02 μm Whatman filter material and analyzed by ICP. The solid material was filtered through a 10 μm Teflon membrane filter, washed with acetone and vacuum-dried overnight at 70° C. The platinum loaded catalyst was then calcined at 450° C. in static air for 4 hours, with a heating ramp of 10° C./min. ICP results on the supernant solution, compared to the original platinum solution, indicated a final platinum loading of 0.77 wt %.

After Pt loading, 1.2922 g of the catalyst product was weighed out and placed in a 50 mL round bottom flask with 20 mL of tetrahydrofuran (THF) solution equipped with a gas inlet and outlet and bubbled with 4% $H_2$ (balance $N_2$) for 1 hour to pre-reduce the platinum already loaded on the oxide support. Separately, 0.012 g of $Re_2(CO)_{10}$ was added to 20 mL of THF in a 40 mL vial and warmed to ensure full dissolution. The rhenium solution was then added to the 50 mL round bottom flask using a syringe needle. The mixture was allowed to stir while bubbling 4% $H_2$ (balance $N_2$) for 2 hours or until the solvent completely evaporated. The gas mixture was then switched from 4% $H_2$ (balance $N_2$) to 100% nitrogen to passivate the surface. Assuming all of the rhenium metal was delivered to the catalyst, the final Re loading was 0.39 wt %.

Example 6

$Ce_{0.33}Zr_{0.33}Ti_{0.33}O_2$ Metal Loading

The following example demonstrates the platinum and rhenium loading of a nanocrystalline support material having the composition $Ce_{0.33}Zr_{0.33}Ti_{0.33}O_2$, which was prepared according to the method described in Example 3. The calcined material was comminuted to a 80-120 mesh size. In a 40 mL vial, 0.54 g of the comminuted powder was weighed out and 5.5 ml (10 mL/g) of 0.20M malic acid/ethanol solution was added. The vial was sealed and placed inside a 50° C. oven for 1 hour with periodic mixing. The catalyst support is then filtered and washed thoroughly with ethanol. After the rinse, the catalyst was dried and immersed in 2.06 g of 1.00 wt % platinum solution by weight for 2 hours at room temperature. The platinum solution consists of 0.58 g of tetraamine platinum nitrate, 0.81 mL of ammonium hydroxide (0.0275 mL/g Pt compound) and the balance a 15 wt % isopropanol in water solution to make up a total of 29.4 g. After the 2 hour immersion, the supernant solution was pushed through a 0.02 mm Whatman filter material and analyzed by ICP. The solid material was filtered through a 10 µm Teflon membrane filter, washed with acetone and vacuum-dried overnight at 70° C. The platinum loaded catalyst was then calcined at 450° C. in static air for 4 hours, with a heating ramp of 10° C./min. ICP results on the supernant solution, compared to the original platinum solution, indicated a final platinum loading of 1.44 wt %.

After Pt loading, 0.5071 g of the catalyst product was weighed out and placed in a 50 mL round bottom flask with 20 mL of tetrahydrofuran (THF) solution equipped with a gas inlet and outlet and bubbled with 4% $H_2$ (balance $N_2$) for 1 hour to pre-reduce the platinum already loaded on the oxide support. Separately, 0.006 g of $Re_2(CO)_{10}$ was added to 20 mL of THF in a 40 mL vial and warmed to ensure full dissolution. The rhenium solution was then added to the 50 mL round bottom flask using a syringe needle. The mixture was allowed to stir while bubbling 4% $H_2$ (balance $N_2$) for 2 hours or until the solvent completely evaporated. The gas mixture was then switched from 4% $H_2$ (balance $N_2$) to 100% nitrogen to passivate the surface. Assuming all of the rhenium metal was delivered to the catalyst, the final Re loading was 0.72 wt %.

Referring to FIG. 1, there is illustrated a simplified schematic block diagram of a fuel processing system (FPS) 10 for processing carbonaceous fuels and employing a durable, sulfur and pressure-tolerant catalyst in accordance with the invention. The FPS 10 is typically suited for the production of a hydrogen-rich fuel stream, as for use in a fuel cell or the like. While the invention is applicable to a WGS catalyst and fuel processing system for various types of fuel sources, it finds particular applicability with respect to the processing of gas derived from the gasification of coal. In such instance, the operating temperatures and pressures, as well as the presence of sulfur in various forms, may be higher than otherwise. The FPS 10 typically includes a reformer/gasifier 12 that converts (or reforms) a carbonaceous fuel feedstock 14 e.g. coal, natural gas, etc., in the presence of steam and/or air or $O_2$-containing gas, to a reformate mixture 16 of $H_2$, CO, $CO_2$, $H_2O$, (and $N_2$). Thereafter, the reformate 16 is supplied to a high-temperature, high pressure, water gas shift reactor (HT, HP WGS) 18, which forms part or all of a WGS section 17. The HT, HP WGS 18 is preferably of the membrane type in which $H_2$ from the WGS reaction may be continuously removed as a permeate, as by an $H_2$-permeable palladium membrane shown in broken line 19. The WGS catalyst 21 of the invention may be arranged or distributed as a film or coating or the like along the membrane 19 of the reactor. Water for the WGS reaction may be added, as by a vaporizer, to the reformate mixture at, or just prior to, entry into the HT, HP WGS reactor 18, as represented by line 20. Requisite supplies and control of air, steam and/or water to the relevant sections of the FPS 10, to the extent not shown, are implied and well understood. Similarly, heat exchangers have not been shown but are implied and well understood.

The HT, HP WGS reactor 18 reduces the CO level (i.e. concentration) and enriches the hydrogen level by supplying additional steam or moisture and reacting it with the reformate 16, according to the reaction (and heat of reaction):

$$CO+H_2O<=>CO_2+H_2 \Delta H_1=-41 \text{ kJ/mole } H_2 \qquad (1)$$

The reformate 16 from the reformer 12 may typically have CO levels, after combining with $H_2O$ for the WGS reaction, of 50,000-620,000 ppmv (5%-62%), and must be reduced significantly to about 50 ppmv or 0.05%, preferably 5 ppmv or 0.0005%. The ultimate use of the hydrogen-rich permeate stream 22 issuing from the HT, HP WGS reactor 18 will determine whether further CO removal is required. In the instance where permeate stream 22 is intended to supply $H_2$ to a fuel cell, it will usually be necessary to reduce the CO level further, as by the optional preferential oxidizer 28 shown in broken line.

In the embodiment described above, the membrane-type WGS reactor 18 may be the only WGS reactor which constitutes the WGS section 17. Alternatively, as depicted in FIG. 2, the WGS section, now labeled 117, of the FPS 11 is comprised of a high temperature WGS reactor (HT WGS) 118 and a low temperature WGS reactor (LT WGS) 124 of more-conventional non-membrane bed type design. In such instance, the durable, supported WGS catalyst 21 of the invention is located in the HT WGS reactor 118 where the operating temperatures, and CO and sulfur levels tend to be relatively higher, eg, in excess of 400° C., etc. While that catalyst might also be used in the LT WGS reactor 124 that operates near or just above 200° C., it is preferable there to use another supported noble metal catalyst.

The catalyst in various types of WGS reactors has previously been Cu/ZnO or the like, and more recently trending to a noble metal on a ceria-containing mixed metal oxide support of the general type described in the aforementioned '515 and/or '241 applications. While the catalysts of the aforementioned '515 and/or '241 applications each have high activity and may perform well at operating temperatures in the 300-450° C. range, it has remained for a catalyst to provide the additional durability to operate under conditions of high sulfur in the reformate and under high operating pressures, which capability is provided by the catalyst of the present invention. Indeed, the reformate 16 may contain levels of sulfur, typically in the form of $H_2S$, in the range of 5-200 ppm or $1 \times 10^{-2}$ atm at 50 atm total pressure, and the operating pressures may be as great as 40-50 atmospheres, or more.

Having described a representative fuel processing system and water gas shift reactor in which the supported catalyst of the present invention operates, it remains to establish the desired ranges of metal constituents, and particularly the Ti, in the mixed metal oxide support, as well as the Pt/Re dispersed on the support, for the improved performance. In that regard, the following FIGS. 3 and 4 provide comparative analyses of the WGS activities of various Ti-containing catalysts vs other supported catalyst compositions.

Referring to FIG. 3, there is graphically depicted the catalyst activity rates for two separate sample catalysts, in moles CO/moles Pt-sec at 380° C., under conditions of 7.2% CO, 7.8% $CO_2$, 6% $H_2$, 39.2% $H_2O$ and 39.8% $N_2$ for the reformate entering the WGS reactor. Catalyst Sample a) is nearly the same as that described with respect to Examples 1 and 4 mentioned above, and is Pt/Re—$Ce_{0.52}Zr_{0.38}W_{0.10}O_2$ in accordance with the catalyst described in the aforementioned '241 application. Catalyst Sample b) is substantially the same as that described with respect to Examples 3 and 6 mentioned above, and is Pt/Re—$Ce_{0.33}Zr_{0.33}Ti_{0.33}O_2$ in accordance with the present invention. The several activity rates depicted for each Catalyst Sample include (i) initial rate at ambient pressure, (ii) aged rate after about 60 hours of operation at ambient pressure, (iii) initial rate at an elevated pressure of 1.8 atm, and (iv) an aged rate at an elevated pressure of 1.8 atm pressure and a sulfur level of 10 ppm It will be noted that the Ti-containing mixed metal oxide performs better than the W-containing mixed metal oxide under each condition, but the difference is particularly noticeable for operation at an aged rate under increased pressure and increased sulfur presence. Indeed, the relative difference in that category is about 500%.

Figure 4:
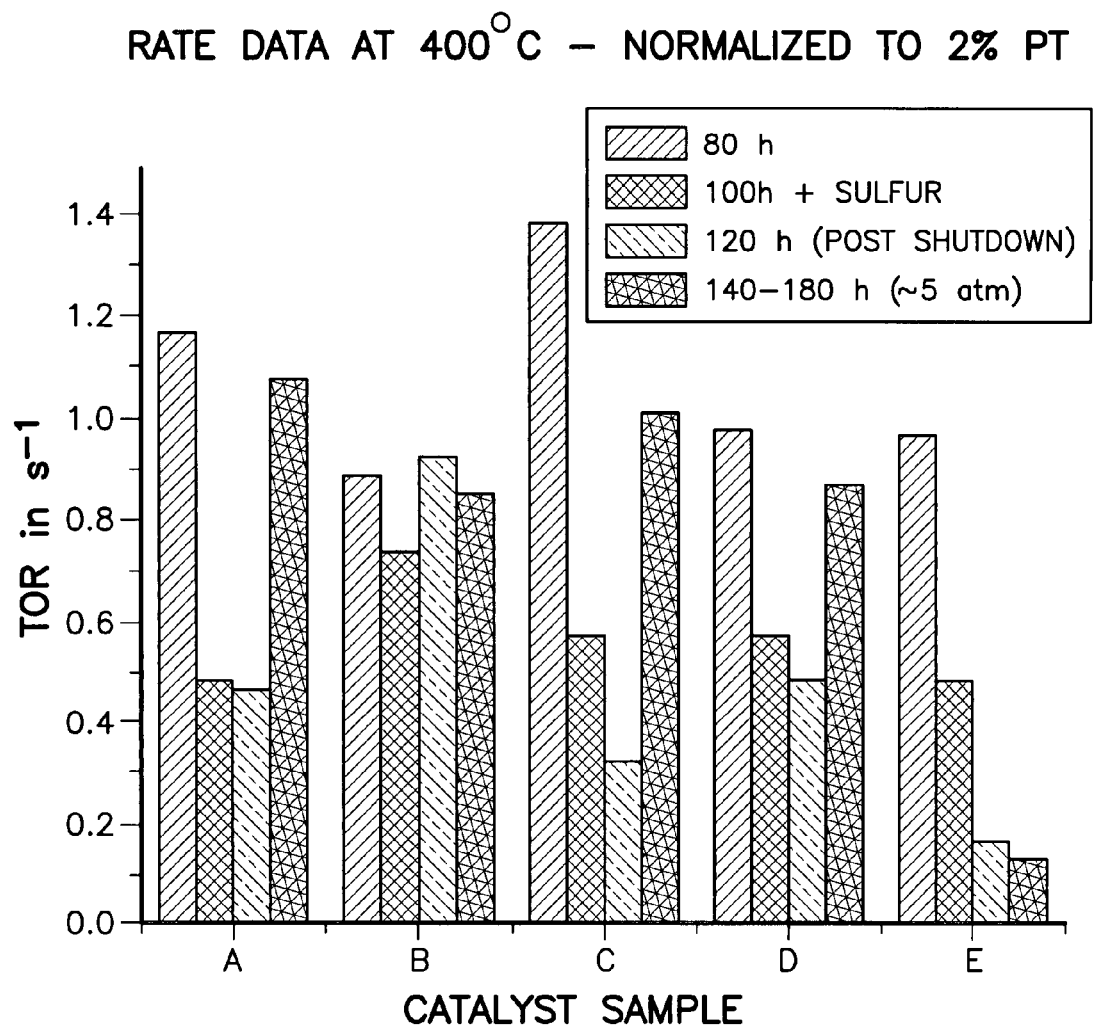
FIG. 4 graphically compares the WGS activity of various preferred Ti-containing catalysts of the invention with that of other catalyst compositions.

Referring to FIG. 4, there is graphically depicted the activities of WGS mixed metal oxide catalysts containing Ce, either ZR or Hf, and either Ti or W, with the comparative emphasis being on the durability and performance contrast between Ti and W as functions of sulfur level, duration, and operating pressure. More specifically, for each of 5 catalyst samples identified as A, B, C, D, and E in the legend table below the graph, the activity, expressed in terms of turn over rate per second, is depicted, from left to right, at 80 hours operation, at 100 hours in the presence of 10 ppm sulfur, 120 hours of operation upon restart after a shutdown, and 140-180 hours of operation after a shutdown which occurred during operation with sulfur and at about 5 atmospheres of operating pressure. In all instances the operation is at 400° C. and the data has been normalized to a Pt loading of 2%. It will be noted that the samples containing Ti and not containing W generally have good performance and durability under each of the measured conditions. Indeed, it is believed the aforementioned data establishes the improved performance and durability for nanocrystalline mixed metal oxide catalyst supports having at least three metal constituents (x, y, and z), the first metal constituent (x) being cerium, the second metal constituent (y) being selected from a group consisting of Zr, Hf, and a combination of Zr and Hf, and the third metal constituent (z) being Ti, with the three metal constituents comprising at least 80% of the metal constituents of said mixed metal oxide and said Ti being present in a range of 5% to 45% by metals only atomic percent of said mixed metal oxide. The mixed metal oxide has an average crystallite size less than 6 nm and is agglomerated to form a skeletal structure with pores, the average pore diameters being in the range between about 4 nm and 9 nm and normally being greater than the average crystallite size. The surface area of the skeletal structure per volume of the material of the structure is greater than about 240 $m^2/cm^3$.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A catalyst for facilitating a water gas shift reaction, the catalyst comprising a noble metal on a mixed metal oxide, said mixed metal oxide comprising a homogeneous, nanocrystalline, mixed metal oxide of at least three metal constituents, the first metal constituent being cerium, the second metal constituent being selected from the group consisting of Zr, Hf, and a combination of Zr and Hf, and the third metal constituent being Ti, said three metal constituents comprising at least 80% of the metal constituents of said mixed metal oxide and said Ti being present in a range of 5% to 45% by metals only atomic percent of said mixed metal oxide, said mixed metal oxide having an average crystallite size less than 6 nm and agglomerated to form a skeletal structure with pores, average pore diameters being in a range between about 4 nm and 9 nm and greater than the average crystallite size, and wherein the surface area of the skeletal structure per volume of the material of the skeletal structure is greater than about 240 $m^2/cm^3$.

2. The catalyst of claim 1 wherein the noble metal on the mixed metal oxide comprises a combination of Pt and Re.

3. The catalyst of claim 2 wherein the weight % of the Pt as a percentage of both the noble metal and the mixed metal oxide is in a range of 1:1 to 4:1 of that of the Re.

4. The catalyst of claim 3 wherein the weight % of the Pt as a percentage of both the noble metal and the mixed metal oxide is in the range of 0.5 to 1.5%.

5. A catalyst for facilitating a water gas shift reaction, the catalyst comprising a noble metal on a mixed metal oxide, said mixed metal oxide comprising a homogeneous, nanocrystalline, mixed metal oxide of at least three metal constituents, the first metal constituent being cerium, the second metal constituent being selected from the group consisting of Zr, Hf, and a combination of Zr and Hf, and the third metal constituent being Ti, said three metal constituents comprising at least 80% of the metal constituents of said mixed metal oxide and said Ti being present in a range of 5% to 45% by metals only atomic percent of said mixed metal oxide, said mixed metal oxide having an average crystallite size less than 6 nm and agglomerated to form a skeletal structure with pores, average pore diameters being in a range between about 4 nm and 9 nm and greater than the average crystallite size, and wherein the surface area of the skeletal structure per volume of the material of the skeletal structure is greater than about 240 $m^2/cm^3$, the mixed metal oxide being prepared by a process including:

a. dissolving compounds of at least one of the group consisting of Ce, Zr, and Hf, and urea in water to form a first metal salt-urea solution;

b. converting an organic Ti precursor to a meta-stable Ti salt solution in acid;

c. combining the meta-stable Ti salt solution in acid with the first metal salt-urea solution;

d. heating the combined meta-stable Ti salt solution in acid and the first metal salt-urea solution nominally to boiling to crystallize and precipitate the mixed metal oxide;

e. recovering the crystallized mixed metal oxide as a solid;

f. washing the crystallized mixed metal oxide with water;

g. replacing the water existing in the crystallized mixed metal oxide with a water miscible, low surface-tension solvent that displaces water;

h. drying the crystallized mixed metal oxide to remove substantially all of any remaining water and solvent; and i. calcining the dried coprecipitate at a moderate temperature below about 600° C. for an interval sufficient to remove adsorbed impurities and stabilize the skeletal structure.

6. A process for the preparation of the catalyst defined in accordance with claim 5, the noble metal loaded on the mixed metal oxide comprising a combination of Pt and Re, and comprising the steps of:

a. loading the mixed metal oxide with the Pt;

b. placing the Pt-loaded mixed metal oxide in a solution;

c. introducing a source of Re in solution to the solution containing the mixed metal oxide with the Pt loading; and d. removing the liquid phase of the combined solutions to provide a solid Re and Pt-loaded mixed metal oxide.

7. The process of claim 6 further comprising the additional steps of, between steps a) and b), calcining the Pt-loaded mixed metal oxide; between steps b) and c), pre-reducing, with dilute $H_2$, the Pt on the Pt-loaded mixed metal oxide; applying mild heat under dilute $H_2$ gas to effect the removal of the liquid phase in step e), passivating the Re and Pt-loaded mixed metal oxide with $N_2$ gas containing a small amount of $O_2$; and exposing the solid, passivated Re and Pt-loaded mixed metal oxide to ambient air.

\* \* \* \* \*